(12) United States Patent
Johnson et al.

(10) Patent No.: US 11,436,465 B2
(45) Date of Patent: *Sep. 6, 2022

(54) REDOX ACTIVE POLYMER DEVICES AND METHODS OF USING AND MANUFACTURING THE SAME

(71) Applicant: Arizona Board of Regents on behalf of Arizona State University, Scottsdale, AZ (US)

(72) Inventors: Paul B. Johnson, Phoenix, AZ (US); Jose Antonio Bautista-Martinez, Mesa, AZ (US); Cody A. Friesen, Fort McDowell, AZ (US); Elise Switzer, Napa, CA (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,241

(22) Filed: Feb. 1, 2021

(65) Prior Publication Data
US 2021/0357719 A1    Nov. 18, 2021

Related U.S. Application Data

(63) Continuation of application No. 16/687,875, filed on Nov. 19, 2019, now Pat. No. 10,909,437, which is a
(Continued)

(51) Int. Cl.
*G06K 19/07* (2006.01)
*G06K 19/077* (2006.01)
(Continued)

(52) U.S. Cl.
CPC ..... *G06K 19/07743* (2013.01); *C08G 61/122* (2013.01); *C08G 61/123* (2013.01);
(Continued)

(58) Field of Classification Search
CPC ........... G06K 19/0702; G06K 19/0716; G06K 19/0717; G06K 19/0723; G06K 19/077;
(Continued)

(56) References Cited

U.S. PATENT DOCUMENTS

| 4,265,789 A | 5/1981 | Christopherson et al. |
| 4,375,427 A | 3/1983 | Miller et al. |

(Continued)

FOREIGN PATENT DOCUMENTS

| EP | 0717418 A2 | 6/1996 |
| JP | 2005510886 A | 4/2005 |

(Continued)

OTHER PUBLICATIONS

Cardoso, Judith, et al., "Synthesis and Characterization of Zwitterionic Polymers with a Flexible Lateral Chain," Journal of Physical Chemistry, vol. 114, Jul. 2010, American Chemical Society, pp. 14261-14268.
(Continued)

*Primary Examiner* — Thien M Le
*Assistant Examiner* — April A Taylor
(74) *Attorney, Agent, or Firm* — Withrow & Terranova, P.L.L.C.

(57) ABSTRACT

The disclosed technology relates generally to apparatus comprising conductive polymers and more particularly to tag and tag devices comprising a redox-active polymer film, and method of using and manufacturing the same. In one aspect, an apparatus includes a substrate and a conductive structure formed on the substrate which includes a layer of redox-active polymer film having mobile ions and electrons. The conductive structure further includes a first terminal and a second terminal configured to receive an electrical signal therebetween, where the layer of redox-active polymer is configured to conduct an electrical current generated by the
(Continued)

mobile ions and the electrons in response to the electrical signal. The apparatus additionally includes a detection circuit operatively coupled to the conductive structure and configured to detect the electrical current flowing through the conductive structure.

18 Claims, 13 Drawing Sheets

Related U.S. Application Data continuation of application No. 16/299,884, filed on Mar. 12, 2019, now Pat. No. 10,482,367, which is a continuation of application No. 15/973,396, filed on May 7, 2018, now abandoned, which is a continuation of application No. 14/710,367, filed on May 12, 2015, now Pat. No. 9,990,578.

(60) Provisional application No. 61/992,772, filed on May 13, 2014, provisional application No. 61/992,781, filed on May 13, 2014, provisional application No. 62/000,843, filed on May 20, 2014.

(51) Int. Cl.
*H01M 4/60* (2006.01)
*C08G 61/12* (2006.01)
*H01M 4/02* (2006.01)

(52) U.S. Cl.
CPC ..... *G06K 19/0702* (2013.01); *G06K 19/0717* (2013.01); *G06K 19/0723* (2013.01); *H01M 4/608* (2013.01); *C08G 2261/142* (2013.01); *C08G 2261/143* (2013.01); *C08G 2261/147* (2013.01); *C08G 2261/1452* (2013.01); *C08G 2261/312* (2013.01); *C08G 2261/3221* (2013.01); *C08G 2261/3223* (2013.01); *C08G 2261/3241* (2013.01); *C08G 2261/3243* (2013.01); *C08G 2261/3246* (2013.01); *C08G 2261/516* (2013.01); *C08G 2261/90* (2013.01); *C08G 2261/92* (2013.01); *H01M 2004/027* (2013.01); *Y10T 29/49018* (2015.01)

(58) Field of Classification Search
CPC .. G06K 19/0772; H01M 4/602; H01M 4/604; H01M 4/606; H01M 6/40; H01M 10/056; H01M 10/0564; H01M 10/425; H01M 10/46; H01M 2220/30; H01M 2300/0085
See application file for complete search history.

(56) References Cited

U.S. PATENT DOCUMENTS

| | | | |
|---|---|---|---|
| 4,535,039 A | 8/1985 | Naarmann et al. |
| 4,869,979 A | 9/1989 | Ohtani et al. |
| 5,512,391 A | 4/1996 | Fleischer |
| 5,569,708 A | 10/1996 | Wudl et al. |
| 5,637,421 A | 6/1997 | Poehler et al. |
| 5,700,398 A | 12/1997 | Angelopoulos et al. |
| 5,731,105 A | 3/1998 | Fleischer et al. |
| 5,776,587 A | 7/1998 | Angelopoulos et al. |
| 5,840,443 A | 11/1998 | Gregg et al. |
| 5,891,968 A | 4/1999 | Wudl et al. |
| 5,916,486 A | 6/1999 | Angelopoulos et al. |
| 5,922,466 A | 7/1999 | Angelopoulos et al. |
| 5,938,979 A | 8/1999 | Kambe et al. |
| 5,973,598 A | 10/1999 | Beigel |
| 5,985,458 A | 11/1999 | Angelopoulos et al. |
| 5,997,773 A | 12/1999 | Angelopoulos et al. |
| 6,045,952 A | 4/2000 | Kerr et al. |
| 6,300,015 B1 | 10/2001 | Nishiyama et al. |
| 6,700,491 B2 | 3/2004 | Shafer |
| 6,762,683 B1 | 7/2004 | Giesler |
| 6,776,929 B2 | 8/2004 | Hossan et al. |
| 6,899,974 B2 | 5/2005 | Kamisuki et al. |
| 6,944,424 B2 | 9/2005 | Heinrich et al. |
| 7,482,620 B2 | 1/2009 | Kugler et al. |
| 7,675,123 B2 | 3/2010 | Leenders et al. |
| 7,722,920 B2 | 5/2010 | Mickle et al. |
| 7,911,345 B2 | 3/2011 | Potyrailo et al. |
| 8,168,337 B2 | 5/2012 | Friesen et al. |
| 8,260,203 B2 | 9/2012 | Brantner |
| 8,309,259 B2 | 11/2012 | Friesen et al. |
| 8,445,133 B2 | 5/2013 | Friesen et al. |
| 8,481,207 B2 | 7/2013 | Friesen et al. |
| 8,546,028 B2 | 10/2013 | Friesen et al. |
| 8,895,197 B2 | 11/2014 | Friesen et al. |
| 9,184,478 B2 | 11/2015 | Friesen et al. |
| 9,236,643 B2 | 1/2016 | Friesen et al. |
| 9,780,394 B2 | 10/2017 | Friesen et al. |
| 9,882,215 B2 | 1/2018 | Johnson et al. |
| 9,990,578 B2 | 6/2018 | Johnson et al. |
| 10,090,520 B2 | 10/2018 | Friesen et al. |
| 10,256,460 B2 | 4/2019 | Friesen et al. |
| 10,374,236 B2 | 8/2019 | Friesen et al. |
| 10,482,367 B2 | 11/2019 | Johnson et al. |
| 10,909,437 B2 * | 2/2021 | Johnson ............ G06K 19/0702 |
| 11,003,870 B2 * | 5/2021 | Friesen ............ H01M 10/0585 |
| 2003/0230746 A1 | 12/2003 | Stasiak |
| 2004/0214078 A1 | 10/2004 | Mitani et al. |
| 2004/0256644 A1 | 12/2004 | Kugler et al. |
| 2006/0102869 A1 | 5/2006 | Cavaille et al. |
| 2006/0263697 A1 | 11/2006 | Dahn et al. |
| 2007/0059901 A1 | 3/2007 | Majumdar et al. |
| 2007/0176773 A1 | 8/2007 | Smolander et al. |
| 2007/0235699 A1 | 10/2007 | Hossan et al. |
| 2007/0238014 A1 | 10/2007 | Koshina et al. |
| 2008/0286907 A1 | 11/2008 | Li et al. |
| 2008/0303637 A1 | 12/2008 | Gelbman et al. |
| 2009/0017342 A1 | 1/2009 | Friesen et al. |
| 2009/0090907 A1 | 4/2009 | Kugler et al. |
| 2009/0117574 A1 | 5/2009 | Labgold et al. |
| 2009/0176162 A1 | 7/2009 | Exnar et al. |
| 2009/0186254 A1 | 7/2009 | Murray |
| 2010/0273063 A1 | 10/2010 | Wallace et al. |
| 2011/0096388 A1 | 4/2011 | Agrawal et al. |
| 2011/0221385 A1 | 9/2011 | Partovi et al. |
| 2011/0300808 A1 | 12/2011 | Rokhsaz et al. |
| 2012/0077084 A1 | 3/2012 | Christensen et al. |
| 2012/0138357 A1 | 6/2012 | Lim et al. |
| 2012/0206239 A1 | 8/2012 | Ikemoto |
| 2013/0194148 A1 | 8/2013 | Fontecchio et al. |
| 2013/0230771 A1 | 9/2013 | Deronzier et al. |
| 2014/0038036 A1 | 2/2014 | Nishide et al. |
| 2015/0310771 A1 | 10/2015 | Atkinson et al. |
| 2015/0333331 A1 | 11/2015 | Johnson et al. |
| 2016/0028070 A1 | 1/2016 | Friesen et al. |
| 2016/0301077 A1 | 10/2016 | Huang et al. |
| 2016/0350565 A1 | 12/2016 | Friesen et al. |
| 2018/0260673 A1 | 9/2018 | Johnson et al. |
| 2019/0036115 A1 | 1/2019 | Friesen et al. |
| 2019/0123340 A1 | 4/2019 | Friesen et al. |
| 2019/0205717 A1 | 7/2019 | Johnson et al. |
| 2019/0276662 A1 | 9/2019 | Friesen et al. |
| 2019/0355996 A1 | 11/2019 | Friesen et al. |
| 2020/0279144 A1 | 9/2020 | Johnson et al. |

FOREIGN PATENT DOCUMENTS

| | | |
|---|---|---|
| TW | I484683 B | 5/2015 |
| TW | 201829530 A | 8/2018 |
| WO | 97030445 A1 | 8/1997 |
| WO | 2008080075 A1 | 7/2008 |
| WO | 2008080075 B1 | 7/2008 |
| WO | 2009124249 A1 | 10/2009 |
| WO | 2009142848 A2 | 11/2009 |
| WO | 2010132357 A1 | 11/2010 |
| WO | 2011143368 A1 | 11/2011 |
| WO | 2013106122 A2 | 7/2013 |
| WO | 2013132106 A1 | 9/2013 |

(56) References Cited

FOREIGN PATENT DOCUMENTS

| WO | 2014164150 A1 | 10/2014 |
|---|---|---|
| WO | 2015106132 A1 | 7/2015 |
| WO | 2015175553 A1 | 11/2015 |
| WO | 2015175556 A1 | 11/2015 |
| WO | 2018081165 A1 | 5/2018 |

OTHER PUBLICATIONS

Chae, IL Seok, et al., "Redox equilibrium of a zwitterionic radical polymer in a non-aqueous electrolyte as a novel Li+ host material in a Li-ion battery," Journal of Materials Chemistry A, vol. 1, Jul. 2, 2013, The Royal Society of Chemistry, pp. 9608-9611.

Chae, IL Seok, "Synthesis of Zwitterionic Redox-Active Radical Polymers and Their Application to an Organic Secondary Battery," PhD Thesis, Waseda University, Feb. 2013, 106 pages.

Ferrer-Vidal, Antonio, et al., "Integration of Sensors and RFID's on Ultra-ow-cost Paper-based Substrates for Wireless Sensor Networks Applications," IEEE Workshop on Wireless Mesh Networks, 2006, IEEE, pp. 126-128.

Golriz, Ali, et al., "Redox Active Polymer Brushes with Phenothiazine Moieties," ACS Applied Materials and Interfaces, vol. 5, Feb. 13, 2013, American Chemical Society, pp. 2485-2494.

Laschewsky, Andre, "Structures and Synthesis of Zwitterionic Polymers," Polymers, vol. 6, May 23, 2014, pp. 1544-1601.

Li, Z.H., et al., "Effect of zwitterionic salt on the electrochemical properties of a solid polymer electrolyte with high temperature stability for lithium ion batteries," Electrochimica Acta, vol. 56, Sep. 2010, Elsevier Ltd., pp. 804-809.

Potyrailo, Radislav, et al., "Battery-free radio frequency identification (RFID) sensors for food quality and safety," Journal of Agricultural and Food Chemistry, vol. 60, Issue 35, Sep. 5, 2013, 22 pages.

Song, Hyun-Kon, et al., "Redox-Active Polypyrrole: Toward Polymer-Based Batteries," Advanced Materials, vol. 18, Issue 13, 2006, pp. 1764-1768.

Song, Zhiping, et al., "Towards sustainable and versatile energy storage devices: an overview of organic electrode materials," Energy and Environmental Science, vol. 6, 2013, RSC Publishing, pp. 2280-2301.

Takashima, "Electroplasticity memory devices using conducting polymers and solid polymer electrolytes," Polymer International, vol. 27, Issue 3, 1992, pp. 249-253.

International Preliminary Report on Patentability for PCT/US2015/030412, dated Nov. 24, 2016, 7 pages.

International Preliminary Report on Patentability for PCT/US2015/030409, dated Nov. 24, 2016, 9 pages.

International Preliminary Report on Patentability for PCT/US2014/020874, dated Sep. 24, 2015, 8 pages.

International Search Report for PCT/US2015/010863, dated Apr. 22, 2015, 4 pages.

International Preliminary Report on Patentability for PCT/US2015/010863, dated Jul. 21, 2016, 14 pages.

Non-Final Office Action for U.S. Appl. No. 14/442,087, dated Jan. 23, 2017, 24 pages.

Final Office Action for U.S. Appl. No. 14/442,087, dated Aug. 8, 2017, 37 pages.

Non-Final Office Action for U.S. Appl. No. 14/442,087, dated Mar. 26, 2018, 44 pages.

Non-Final Office Action for U.S. Appl. No. 15/973,396, dated Jun. 28, 2018, 10 pages.

Non-Final Office Action for U.S. Appl. No. 14/710,509, dated Jun. 1, 2017, 7 pages.

Notice of Allowance for U.S. Appl. No. 14/710,509, dated Sep. 22, 2017, 7 pages.

Notice of Allowance for U.S. Appl. No. 14/710,367, dated Feb. 8, 2018, 8 pages.

Non-Final Office Action for U.S. Appl. No. 14/710,367, dated Sep. 22, 2017, 30 pages.

Non-Final Office Action for U.S. Appl. No. 14/710,367, dated Mar. 24, 2017, 19 pages.

Final Office Action for U.S. Appl. No. 14/442,087, dated Dec. 10, 2018, 45 pages.

Non-Final Office Action for U.S. Appl. No. 14/774,636, dated Oct. 20, 2017, 7 pages.

Final Office Action for U.S. Appl. No. 14/774,636, dated May 23, 2018, 5 pages.

International Search Report for PCT/US2014/020874, dated Jul. 1, 2014, 2 pages.

Non-Final Office Action for U.S. Appl. No. 14/442,087, dated Jun. 28, 2019, 43 pages.

Final Office Action for U.S. Appl. No. 14/442,087, dated Mar. 6, 2020, 49 pages.

Advisory Action and AFCP 2.0 Decision for U.S. Appl. No. 14/442,087, dated May 8, 2020, 4 pages.

Non-Final Office Action for U.S. Appl. No. 16/211,740, dated Mar. 30, 2020, 9 pages.

Non-Final Office Action for U.S. Appl. No. 16/299,884, dated Jun. 28, 2019, 14 pages.

Notice of Allowance and Examiner-Initiated Interview Summary for U.S. Appl. No. 16/299,884, dated Aug. 23, 2019, 9 pages.

Non-Final Office Action for U.S. Appl. No. 14/442,087, dated Jun. 12, 2020, 58 pages.

Notice of Allowance for U.S. Appl. No. 14/442,087, dated Feb. 10, 2021, 19 pages.

Final Office Action for U.S. Appl. No. 16/211,740, dated Jul. 15, 2020, 9 pages.

Non-Final Office Action for U.S. Appl. No. 16/687,875, dated Jul. 10, 2020, 8 pages.

Notice of Allowance for U.S. Appl. No. 16/687,875, dated Oct. 1, 2020, 8 pages.

* cited by examiner

REDOX ACTIVE POLYMER DEVICES AND METHODS OF USING AND MANUFACTURING THE SAME

CROSS-REFERENCE TO RELATED APPLICATIONS

This application is a continuation of U.S. patent application Ser. No. 16/687,875, filed Nov. 19, 2019, now U.S. Pat. No. 10,909,437, which is a continuation of U.S. patent application Ser. No. 16/299,884, filed Mar. 12, 2019, now U.S. Pat. No. 10,482,367, which is a continuation of U.S. patent application Ser. No. 15/973,396, filed May 7, 2018, which is a continuation of U.S. patent application Ser. No. 14/710,367, filed May 12, 2015, now U.S. Pat. No. 9,990,578, which claims priority to U.S. Provisional Patent Application No. 61/992,772, filed May 13, 2014, U.S. Provisional Patent Application No. 61/992,781, filed May 13, 2014, and U.S. Provisional Patent Application No. 62/000,843, filed May 20, 2014, each of which is assigned to the assignee of currently claimed subject matter and incorporated by reference in its entirety.

STATEMENT REGARDING FEDERALLY SPONSORED R&D

This invention was made with government support under DE-AR0000459 awarded by the Department of Energy. The government has certain rights in the invention.

BACKGROUND

Field of the Invention

The disclosed technology relates generally to devices comprising conductive polymers and more particularly to tag devices comprising a redox-active polymer film, and method of using and manufacturing the same.

Description of the Related Art

Conductive structures made from conductive polymer films are used in a wide variety of applications and often offer advantages over their metallic counterparts. For example, conductive structures made from conductive polymers can offer advantages in cost, flexibility, weight, form factor and ease of manufacturing to name a few. For example, conductive structures made from conductive polymer films can be used for connecting, fastening and electromagnetic shielding, to name a few applications. Some conductive polymers comprise conjugated double bonds which provide the electronic conduction. Redox-active polymers are conducting polymers comprising functional groups capable of reversibly transitioning between at least two oxidation states wherein the transition between states occurs through oxidation (i.e. electron loss) and reduction (i.e. electron gain) processes. In addition to redox activity provided by the redox center, some redox-active polymers may be electrically conductive through the polymer chain (e.g. polyaniline).

SUMMARY

The disclosed technology relates generally to devices comprising conductive polymers and more particularly to tag devices comprising a redox-active polymer film, and method of using and manufacturing the same.

In one aspect, a tag apparatus comprises a substrate and a conductive structure formed on the substrate. The conductive structure includes a layer of redox-active polymer film having mobile ions and mobile electrons. The conductive structure further includes a first terminal and a second terminal configured to receive an electrical signal therebetween, where the layer of redox-active polymer is configured to conduct an electrical current generated by the mobile ions and electrons in response to the electrical signal. The apparatus additionally comprises a detection circuit operatively coupled to the conductive structure and configured to detect the electrical current flowing through the conductive structure.

In another aspect, an active tag apparatus comprises an electrochemical energy storage device. The electrochemical storage device comprises a first electrode layer comprising a first redox-active polymer having mobile ions and mobile electrons and a second electrode layer comprising a second redox-active polymer film having mobile ions and mobile electrons. The first electrode has a first redox potential and the second electrode has a second redox potential higher than the first redox potential. The electrochemical energy storage device additionally comprises an electrolyte layer interposed between the first electrode layer and the second electrode layer. The electrolyte layer includes a conductive polymer film configured to conduct ionic current by passing mobile ions therethrough between the first and second electrode layers, and the conductive polymer film is further configured to not conduct a substantial amount of electronic current. The active tag apparatus additionally comprises a load device operatively coupled to the storage device. Under a charge condition, the storage device is configured to be charged via an ionic current flowing through the electrolyte layer between the first electrode layer which is configured to be reduced and second electrode layer which is configured to be oxidized. Under a discharge condition, the first electrode layer is configured to be oxidized and the second electrode is configured to be reduced such that an electronic current flows through the load device.

In another aspect, an active tag device comprises a conductive structure having a first terminal and a second terminal and configured to receive an electromagnetic signal therebetween, the conductive structure comprising a redox-active polymer film having mobile ions and mobile electrons and configured to conduct an electrical current generated by the mobile ions and the mobile electrons in response to the electromagnetic signal. The active tag device additionally comprises a conversion circuit configured to convert the electromagnetic signal into a DC voltage. The active device further comprises a storage device having a first electrode layer and a second electrode layer configured to receive the DC voltage, the storage device further comprising an electrolyte layer interposed between the first electrode layer and the second electrode layer. The electrolyte layer comprises a conductive polymer film configured to pass mobile ions, and the storage device is configured to be charged in response to the DC voltage developed by mobile ions passing between the first and second electrode layers in response to the DC voltage.

These and other embodiments are described in greater detail below.

BRIEF DESCRIPTION OF THE DRAWINGS

Claimed subject matter is particularly pointed out in the concluding portion of the specification. However, organization and/or method of operation, together with certain objects, features, and/or advantages thereof, may be better understood by reference to the following detailed description if read with the accompanying drawings in which:

DETAILED DESCRIPTION

Figure 1A:
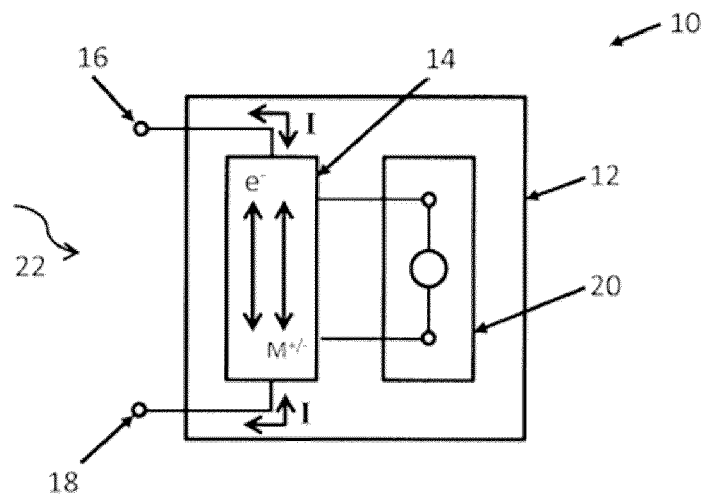
FIG. 1A is a schematic illustration of an apparatus having conductive polymers according to some embodiments.

Electrically conductive polymers are organic polymers often comprising conjugated double bonds which provide electronic conduction properties (e.g. polyacetylene). Redox-active polymers are polymers comprising functional groups capable of reversibly transitioning between at least two oxidation states wherein the transition between states occurs through oxidation (i.e. electron loss) and reduction (i.e. electron gain) processes. In addition to redox activity provided by the redox center, redox-active polymers may be electrically conductive through the polymer chain (e.g. polyaniline). For the purposes of the following description, the term "redox-active polymer" may be used interchangeably with the term "redox polymer" to describe conductive redox-active polymers.

Conductive structures made from conductive polymer films are used in a wide variety of applications and often offer advantages over their metallic counterparts, including lower cost, flexibility, lower weight, lower form factor and ease of manufacturing. Examples of such application can include electronic components such as an antenna, a resistor, an inductor, a capacitor, a diode, a light-emitting element and a transistor, to name a few. Other example applications include conductive tags, tag devices and adhesive members. Conventionally, such devices can be made from thin metallic materials, or from nonconductive medium such as polymeric sheets having metallic or other conductive elements in the form of a metallic paint, metallic tape or metallic or carbon fiber, nanotube and/or particle forming a conductive network therein and/or thereon. The nonconductive medium which includes the metallic or other conductive elements can be, for example, a polymer layer and/or matrix e.g. epoxy, vinylester, polyester, thermoplastic and/or phenol formaldehyde resin to name a few.

One particular application of conductive polymers can include a tag device. As used herein, a tag broadly refers to any conductive structure that may be affixed to a parent structure for the purpose of providing, for example some information about the parent structure. A tag can be, for example, an adhesive, a label, a sticker, an identification tag or a radio frequency identification (RFID) tag, to name a few examples. The information can be any information, such as a product information (e.g. location, age, etc.) and environmental information (temperature, humidity, etc.), among other types of information.

The tag may be adhered to a parent object or structure via an adhesive, printing, electrodeposition or other adhering process. The location, identification and flow of assets (e.g. consumer products, merchandise, inventory, goods, animals, etc.) are often monitored by affixing a tag to the parent object. Commonly, radio-frequency identification (RFID) tags are affixed to a parent object for monitoring its related information which may be stored in a memory component (e.g. microchip) of the RFID tag. A suitable electromagnetic field may be employed to read and/or change information related to the parent object. Passive RFID tag devices are limited by the strength and radius of the interrogative electromagnetic field and consequently limited to short communication ranges and data tracking time periods. Active RFID tags have energy storage capability which overcomes the limitations related to passive tags, however they are limited in expense, complexity and size.

Labels, stickers, radio frequency identification (RFID) tags and other adhesive products are used for communicating information either in writing or electromagnetically. These systems are also often used as the primary or secondary fastening systems in consumer and automotive electronics and various types of enclosures. For example, identification tags may be affixed to a product for the purpose of inventory control. Conventional active and semi-passive tags are prohibitively expensive for low-cost applications and products. Currently, active and semi-passive tags are too expensive for low-cost item inventory control due to the cost of the energy storage component. Conventional active tags typically comprise a battery which powers microchip circuitry. Additionally, active tags may employ batteries to power an antenna for signal broadcast. Semi-passive tags typically comprise a battery to power microchip circuitry, however interrogative electromagnetic waves induce an antenna current for signal broadcast.

Conventional low-cost passive tags do not comprise a battery or energy storage means. Passive tags operate via a backscatter mechanism wherein an incoming interrogative waveform is modulated by the tag and reflected back to a reader. There are several drawbacks of conventional low-cost passive tags including restricted signal ranges, limited "active" time periods and low signal-to-noise ratios due to the absence of an energy storage component.

Thus, there is a need for tag devices and other similar devices made from conductive polymers which can offer existing benefits of tags made from other materials, which can also be integrated with low cost energy storage devices such as thin film batteries. The current limitations of both active and passive tags may be overcome by employing embodiments of the tag devices described herein. For example, in various embodiments the tag devices are simple, low cost energy storage systems which are readily manufacturable. The polymer tag may be employed for communication, identification, shielding, connecting, fastening and/or any other suitable application.

Referring to FIG. 1A, a tag apparatus 10 comprises a substrate 12 and a conductive structure 14 formed on the substrate 12 according to some embodiments. The conductive structure 14 includes a layer of redox-active polymer film having mobile ions (M+/−) and electrons (e−). The conductive structure 14 further includes a first terminal 16 and a second terminal 18 configured to receive an electrical signal 22 therebetween, where the layer of redox-active polymer is configured to conduct an electrical current (I) generated by the mobile ions and the electrons in response to the electrical signal. The apparatus additionally comprises a detection circuit 20 operatively coupled to the conductive structure 14 and configured to detect the electrical current (I) flowing through the conductive structure 14.

In the illustrated tag apparatus 10 of FIG. 1A, the conductive structure 14 can include at least one electronic component selected from the group consisting of an antenna, a resistor, an inductor, a capacitor, a diode, a light-emitting element and a transistor.

In one embodiment, the tag apparatus 10 is a passive identification (ID) tag and the conductive structure 14 comprises an antenna having the first and second terminals 16 and 18 configured to receive the electrical signal 22, in the form of an electromagnetic (EM) electrical signal. For example, the tag apparatus 10 can be a passive radio frequency identification (RFID) device having the conductive structure 14 comprising an antenna configured to receive a radio frequency electromagnetic electrical signal.

In embodiments where the tag apparatus 10 is an ID tag, an electronic component selected from the group consisting of a resistor, a capacitor, a diode and a transistor, or a combination thereof, can be used to store identification information. As used herein identification information can be any information, such as that which may be stored in an ID tag.

Still referring to FIG. 1A, the detection circuit 20 can include at least one of a voltage detection circuit or a current detection circuit that is electrically connected and is integrated on the same substrate 12 as the conductive structure 14. The detection circuit 20 can be configured to detect the identification information from the conductive structure 14. In embodiments where the tag apparatus 10 is a passive ID tag, e.g., a passive RFID tag, the detection circuit 20 can include any one or more circuit components in RFID chips that are used for detecting the identification information, whose description can be found, for example, in U.S. Pat. No. 6,700,491 (hereinafter '491 Patent), which is hereby incorporated by reference in its entirety, and particularly for the purpose of describing such components and chips.

In some embodiments, the detection circuit 20 can be configured to detect a change in electrical conductivity of the redox-active polymer of the conductive structure 14 in response to a change in the temperature of the conductive structure 14 of 1° C. or greater, 5° C. or greater, or 10° C. or greater. In other embodiments, the detection circuit 20 is configured to detect a change in electrical conductivity of the redox-active polymer of the conductive structure 14 in response to a change in the relative humidity surrounding the conductive structure of 1% percent or greater, 5% percent or greater, or 10% percent or greater. In embodiments where the detection circuit 20 is configured to detect a change in electrical conductivity of the redox-active polymer in response to a change in the relative humidity, the layer of redox-active polymer can include a hygroscopic additive selected from the group consisting of chloride salts, sulfate salts, nitrate salts and/or organic salts to enhance the detection capability of the moisture.

Advantageously, in some embodiments, the detection circuit 20 comprises a layer of redox-active polymer film that integrally extends from the layer of redox-active polymer film of the conductive structure 14. That is, at least portions of the detection circuit 20 and the conductive structure 14 can comprise the same layer of the conductive structure 14.

Figure 1B:
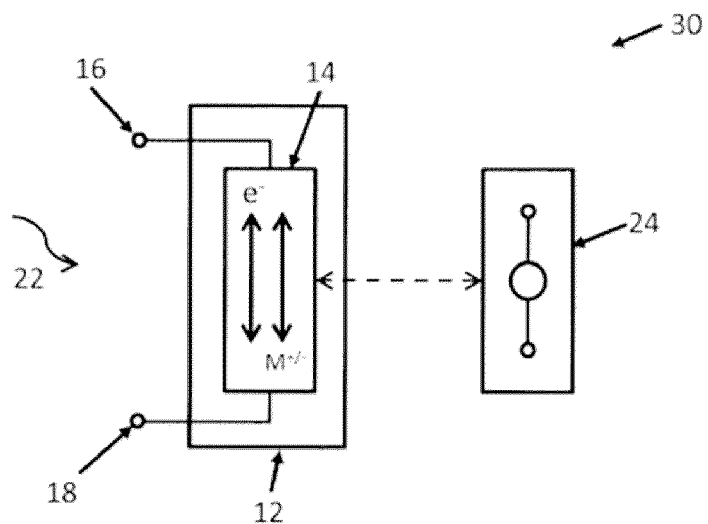
FIG. 1B is a schematic illustration of an apparatus having conductive polymers according to some other embodiments.

While in FIG. 1A, the detection circuit 20 is integrated with the conductive structure 14 on the same substrate 12, other arrangements are possible, as illustrated in a tag apparatus 30 of FIG. 1B. The tag apparatus 30 of FIG. 1B is similar to the tag apparatus 10 of FIG. 1A, except that the detection circuit 24 is physically separated from the substrate 12, on which the conductive structure 14 is formed. For example, the detection circuit 24 can comprises one of a voltage detection circuit or a current detection circuit that is physically separated from the substrate. The detection circuit 24 can be configured to receive electromagnetic signal such as an electromagnetic signal (e.g., RF signal), for example, where the conductive structure 14 is configured to emit an electromagnetic signal. The detection circuit 24 can also be configured to receive photons (e.g., visible or infrared photons), for example, where the conductive structure 14 is configured to emit photons. In other embodiments, the detection circuit 24 can be configured to contact certain points of the conductive structure 14 or terminals.

Figure 2:
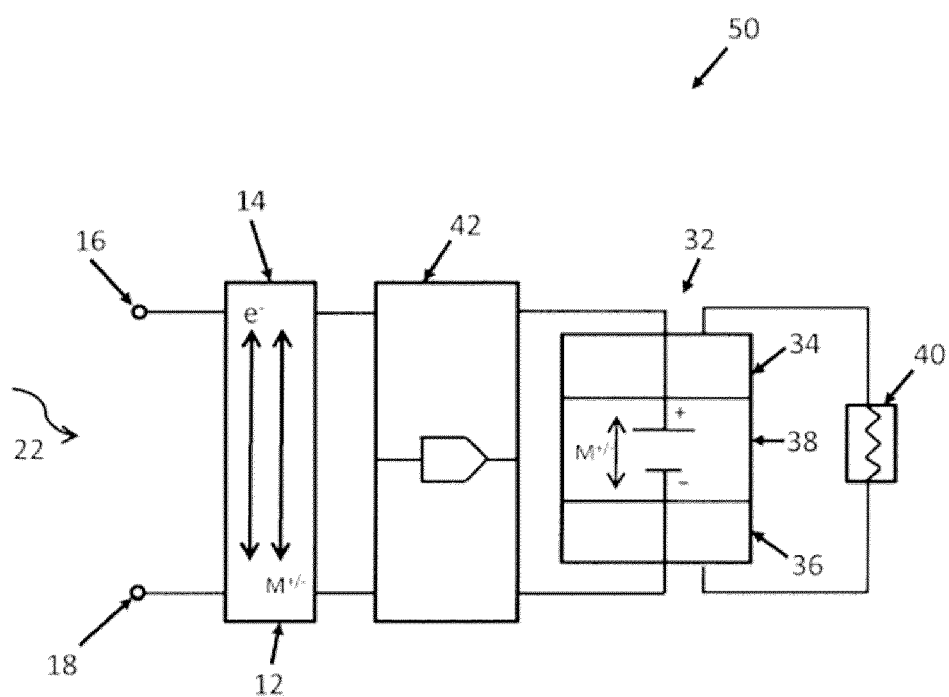
FIG. 2 is a schematic illustration of an apparatus having conductive polymers according to some other embodiments.

Referring to FIG. 2, an active tag apparatus 50 comprises an electrochemical energy storage device 32. The electrochemical storage device 32 comprises a first electrode layer 34 comprising a first redox-active polymer having mobile ions and mobile electrons and a second electrode layer 36 comprising a second redox-active polymer film having mobile ions and mobile electrons. The first electrode 34 has a first redox potential and the second electrode 36 has a second redox potential higher than the first redox potential. The electrochemical energy storage device 32 additionally comprises an electrolyte layer 38 interposed between the first electrode layer 34 and the second electrode layer 36.

The electrolyte layer 38 includes a conductive polymer film configured to conduct ionic current by passing mobile ions therethrough between the first and second electrode layers 34 and 36, and the conductive polymer film is further configured to not conduct a substantial amount of electronic current. The active tag apparatus 50 additionally comprises a load device 40 operatively coupled to the storage device 32. Under a charge condition, the storage device 32 is configured to be charged through an ionic current flowing through the electrolyte layer between the first and second electrode layers 34 and 36. Under a discharge condition, the first electrode layer 34 is configured to be oxidized and the second electrode 36 is configured to be reduced such that an electronic current flows through the load device 40.

Still referring to FIG. 2, in some embodiments, the active tag apparatus 50 is an active ID device having an antenna configured to receive and transmit an electromagnetic electrical signal using energy from the storage device 32, where the active tag device 50 further comprises a conductive structure 14 having a first terminal 16 and a second terminal 18 and configured to receive an electromagnetic signal 22 therebetween. The conductive structure 14 comprises a redox-active polymer film having mobile ions (M+/M−) and electrons (e−) and configured to conduct an electrical current generated by the mobile ions (M+/M−) and the electrons (e−) in response to the electromagnetic signal 22. In these embodiments, the active tag apparatus 50 additionally comprises a conversion circuit 42 configured to convert the electromagnetic signal 16 into a DC voltage. The electrochemical energy storage device 32 is configured to be charged in response to the DC voltage developed by mobile ions passing between the first and second electrode layers 34 and 36 in response to the DC voltage.

Still referring to FIG. 2, in some embodiments, the load device 40 comprises an electromagnetic wave transmission device, such as an RF transmitter. In other embodiments, the load device 40 comprises an electroluminescent device, such as a photodiode. In some embodiments, the electroluminescent device comprises at least one of the first and second redox-active polymer films of the electrochemical energy storage device 32.

In some other embodiments, the load device 40 comprises an ID chip configured to transmit identification information. In some embodiments, the load device 40 comprises an RFID chip which can include any one or more circuit components in RFID chips that are that are commonly included in such chip, whose description can be found, for example, in the '491 Patent.

In some embodiments, by choosing a value of impedance or the resistance of the load device, along with a combination of the combination of redox-active polymers having the properties described herein, the load device can be configured to dissipate substantially the energy stored in the storage device 32 within a predetermined time period. That is, the tag apparatus can be configured to have an active time period during which an electromagnetic or a light signal can be transmitted. This time period can be altered based on the size, number of layers, redox-active polymer chemistry. For example, the load device is configured to transmit an electromagnetic signal or a light signal for a predetermined time period between about 10 seconds and about 24 hours, or between about 1 day and 10 days, or between about 10 days and about 1 year. As a non-limiting example, depending on the application, the tag apparatus may be configured as a small (e.g. <1 cm$^2$), single layer redox polymer film having a low characteristic charge capacity (e.g. <100 Ah/kg). Alternatively, for applications suitable for longer "active" time periods, the tag apparatus may be configured as a larger (e.g. >100 cm$^2$) multi-layer (e.g. >3 layers) system comprising redox polymer with high characteristic charge capacities (e.g. >300 Ah/kg). For example, a 1 cm$^2$ tag having a thickness of 300 μm with an energy density of 100 Wh/L provides enough power to operate a RFID label for several read cycles or continuously power antenna signal of 100 mW for almost 2 minutes. As another non-limiting example, a 25 cm$^2$ tag having a thickness of 0.2 cm (five layers of 300 μm thick cells) with an energy density of 300 Wh/L provides enough power to operate a label for over 10 hours.

In the following, referring to FIG. 3, an electrochemical cell 100, similar to the electrochemical storage device 32 of FIG. 2, is discussed in detail. The electrochemical cell 100 includes a negative electrode, or anode 110, which comprises a redox polymer having a standard redox potential Ea. The electrochemical cell 100 additionally includes a positive electrode, or cathode 120, which comprises a redox polymer having a standard redox potential Ec wherein Ec is generally more positive than Ea. A solid-state ion-exchange polymer electrolyte or ionically conductive polymer or gel 130 is situated between the anode 110 and cathode 120 permitting ionic conduction between anode 110 and cathode 120. During discharge, the oxidation half-reaction may take place at the anode 110. The electrons produced in the oxidation process at the anode 110 may flow to a load 140 (associated with the device or apparatus) and return to the cathode 120 to facilitate the reduction of the redox polymer at the cathode 120. During the charge process via an external power source, the redox polymer at the anode 110 is reduced and the redox polymer at the cathode 120 is oxidized.

In an embodiment, the thickness of the anode 110 and cathode 120 may be less than 200 μm, the ion-exchange polymer 130 may be less than 100 μm and the thickness of the cell 100 may be less than 500 μm. In another embodiment, the thickness of the anode 110 and cathode 120 may be less than 125 μm, the ion-exchange polymer 130 may be less than 50 μm and the thickness of the cell 100 may be less than 300 μm.

In an embodiment, the electrochemical cell 100 may comprise protective compounds functioning to protect redox polymers from over-charge and/or over-discharge. Over-discharge may result in irreversible reduction of a positive electrode redox polymer and/or irreversible oxidation of a negative electrode redox polymer. Likewise, over-charge may result in irreversible oxidation of a positive electrode redox polymer and/or irreversible reduction of a negative electrode redox polymer. For example, redox shuttles or any other suitable compounds may be reversibly reduced or oxidized instead of over-charging or over-discharging a redox polymer of the anode 110 or cathode 120. These protective compounds may be present in the negative electrode, positive electrode or a combination thereof. Non-limiting examples of protective compounds include phenothiazine, iodine, tri-iodine, quinones (e.g. benzoquinones, naphthoquinones, and anthraquinones), their derivatives and combinations thereof.

In an embodiment, a redox polymer may be a constituent of a copolymer or polymer blend. In addition to other properties, blending and/or copolymerization may improve the mechanical stability of the electrode during fabrication and/or during long-term charge-discharge cycling. Some non-limiting examples of copolymer or polymer blends are described below.

For example, a suitable polymer blend may be provided to enable thermoplastic manufacturing processes (e.g., thermoforming). For example, conductive polymers are generally not thermoplastics (e.g., thermoformable) so a plasticizer (e.g. esters of polycarboxylic acids, phthalate esters and so on) and/or other suitable additives that increase plasticity or fluidity may be a component of a co-polymer or polymer blend.

As another example, the redox-active polymer may have limited electrical conductivity alone. In an embodiment, a more conductive polymer may be blended or copolymerized with a redox-active polymer. In some embodiments, polymers with higher conductivities may also be redox polymers themselves. For example, linear-backbone "polymer blacks" like polyacetylene, polypyrrole, and polyaniline may provide increased electrical conductivity. Non limiting examples include polyfluorenes, polyphenylenes, polypyrenes, polyazulenes, polynaphthalenes, polyacetylenes, polyphenylenevinylenes, polypyrroles, polycarbazoles, polyindoles, polyazepines, polyanilines, polythiophenes, polyphenylenesulfides, their derivatives and combinations thereof.

In some embodiments, it may be preferable to make the polymer film more porous in order to facilitate the ion exchange of the polymer redox states. Ionic conductivity of an electrode may be improved with the use of any suitable additive providing increased free volume and/or porosity within a polymer electrode. In some embodiments, the additive may be a component of a copolymer or polymer blend. For example, manufacturing methods that incorporate porosity may include: incorporating bulky, contorted monomer structures resulting in inefficient polymer chain packing (e.g. tetrahedral monomers), blending a redox-active polymer with a second polymer which is soluble in a solvent, using gas phase foaming agents, using chemically decomposing foaming agents, inducing phase separation in the presence of non-solvents, applying shear stresses sufficient to cause fibril formation and coalescence or any other suitable method known in the polymer engineering arts. As another example, the redox-active polymer may have limited mechanical stability alone. In an embodiment, a material providing increased mechanical stability may be blended or copolymerized with a redox-active polymer. For example, two polymers may be blended to provide improved fiber rheology resulting in a relatively high degree of mechanical stability. In some embodiments, a separate membrane with high mechanical stability may be provided in layers of the battery. As yet another example, a redox-active polymer may be blended with a polymer which provides improved adhesion to a substrate. In some embodiments, it may be desirable to improve adhesion to a current collector, separator and/or some feature of the associated device or apparatus.

Figure 3:
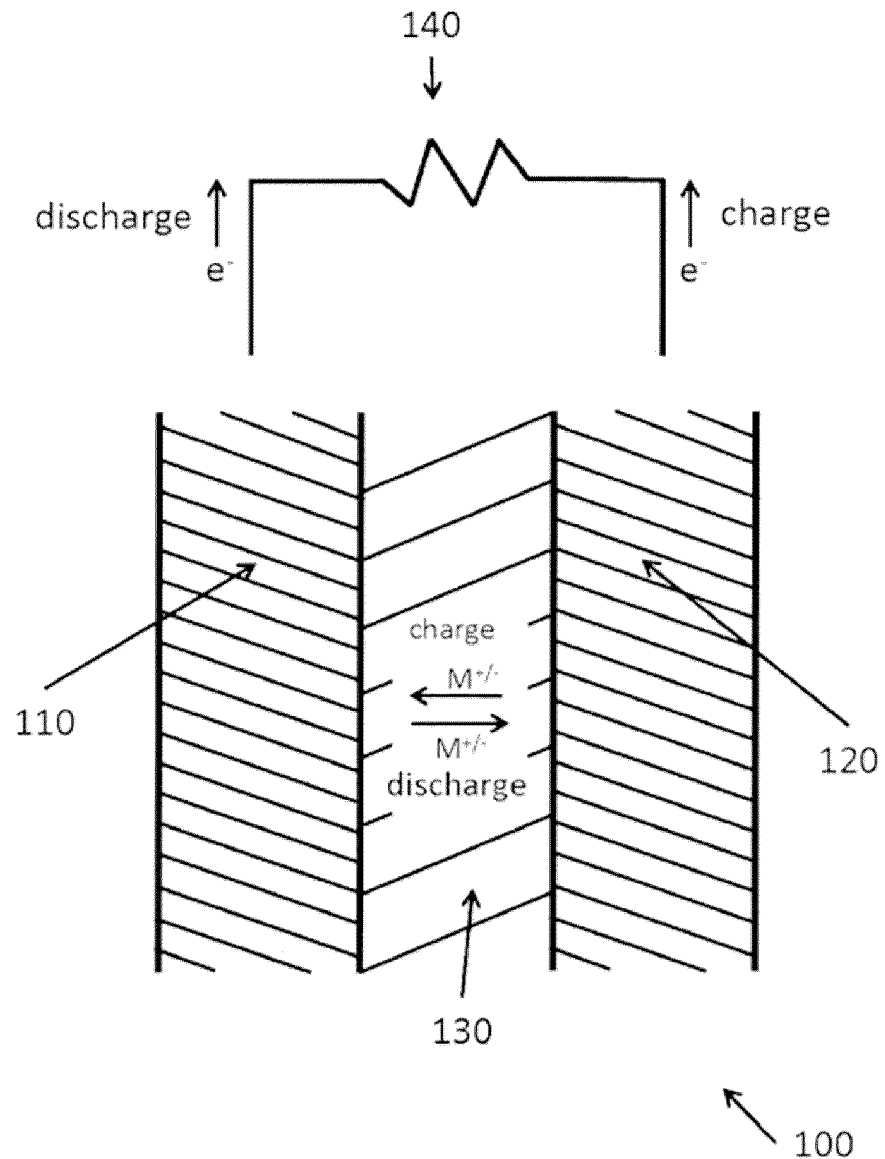
FIG. 3 is a schematic illustration of an apparatus having conductive polymers according to some other embodiments.

Still referring to FIG. 3, in an embodiment, the redox polymers may be in contact with a conductive sheet or film to provide increased electrical conductivity and/or mechanical stability. This may be performed by any suitable method known in the art including lamination, film casting, film coating, electropolymerization, physical vapor deposition, and so on. For example, the redox polymer may be a metallized film wherein the redox polymer is coated on a thin layer of metal acting as a current collector. In some embodiments, the redox polymer may be in contact with a non-conductive sheet or film providing mechanical stability, as some feature of the device and/or as a general separator. In an embodiment, the system may comprise a plurality of electrochemical cells 100 formed in layers wherein the negative electrode or anode 110 of a first cell 100 is electrically connected to an anode of a second cell and the positive electrode or cathode 120 of the first cell 100 is electrically connected to a cathode of a third cell. Such a configuration may be repeated any suitable number of times and numerous other arrangements are also possible, depending on the specifics of the application.

n an embodiment, polymers may be synthesized by any suitable method known in the art, including but not limited to chemical oxidation or reduction, metal complex dehalogenation, metal complex coupling, step-growth polymerization, chain-growth polymerization, electropolymerization and so on.

Still referring to FIG. 3, in an embodiment, the electrochemical cell 100 or plurality of electrochemical cells 100 and its associated device, apparatus or system (e.g. electric vehicles, consumer electronics etc.) may be manufactured by an injection molding process, additive manufacturing process and/or any other suitable manufacturing method.

In an embodiment, the polymer may comprise dopants modifying the electrical conductivity or other properties. The dopants may be incorporated into the redox polymers by any suitable method. For example, the dopants may include charged species which may be incorporated during electrochemical oxidation and/or reduction processes. In a feature of an embodiment, oxidative and/or reductive doping may improve the electrical conductivity of the redox polymer. In some embodiments, the redox polymer may be activated before or after cell 100 assembly. For example, the redox polymer may be oxidized or reduced before integration into cell 100 in an ionically conductive medium comprising preferred dopant species, if any.

In an embodiment, the redox polymer structure may comprise an electrically conductive polymer backbone with functional side groups having redox activity. In some embodiments, the redox polymer may have a structure wherein the preferred redox-active groups are part of a main electrically conductive polymer chain. The polymer includes a redox-active group that can exist in at least two oxidation states. In an embodiment, redox-active groups of the organic polymer may comprise cyclic or acyclic heteroatoms including but not limited to O, S, N, P, transition metals, metallocenes and combinations thereof. For example, the redox-active groups may include cyclic, polycyclic and/or acyclic structures comprising alkanes, alkenes, benzenes, styrenes, alcohols, ketones, esters, ethers, amines, amides, imines, imides, alkylamines, pyridines, thiols, thiophenes, thiones, thials, phenothiazines, sulfides, sulfoxides, phosphines, phosphones, halides, quinones, their derivatives and combinations thereof.

In an embodiment, the redox-active group may form quinoid structures. For example, structures may include benzoquinones, naphthoquinones, anthraquinones, hydroquinones, aminoquinones, polyvinylquinones, polycyclic quinones, their derivatives or combinations thereof.

Figure 4:
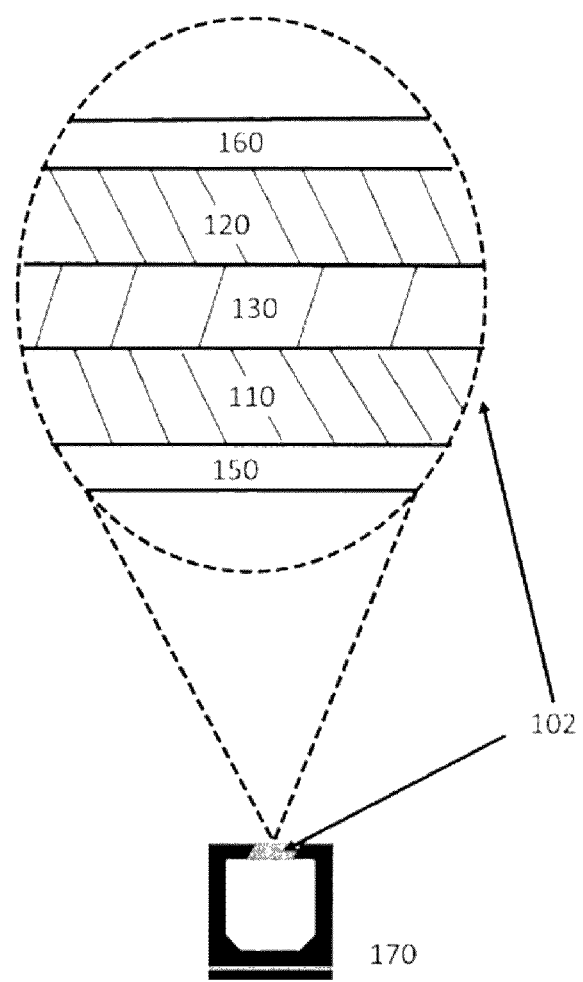
FIG. 4 is an illustration of a tag device having conductive polymers according to some embodiments.

Referring now to FIG. 4, a tag device 102 comprises a first anode, or a negative electrode, layer 110. The tag device may store and deliver energy via electrochemical redox processes. The first anode layer 110 comprises a redox-active polymer film is capable of being oxidized during a discharging operation of the tag device 102. The first anode redox-active polymer of first anode layer 110 may be characterized by a first redox potential. A second cathode, or positive electrode, layer 120 comprises a redox-active polymer film capable of being reduced during a discharging operation. The second cathode redox-active polymer may be characterized by a second redox potential. An electrolyte layer 130 is situated between the first anode layer 110 and second cathode layer 120. The electrolyte layer 130 comprises an ionically conductive polymer film for conducting ions between the first anode layer 110 and second cathode layer 120. The electrolyte layer 130 may be solid-state or in some embodiments, may be a gel. The electrolyte layer 130 does not conduct a substantial amount of electronic current.

In some embodiments, the redox-active polymers are selected to reversibly store electrochemical energy. During a charging operation, the anode redox-active polymer is capable of being reversibly reduced and the cathode redox-active polymer is capable of being reversibly oxidized. The presence of an electromagnetic field may provide the power for the charging operation via induction. In some embodiments, redox-active polymers may be provided in the form of an induction coil.

The negative electrode and positive electrode redox active polymers may be selected from the group of substituted or unsubstituted polyacetylenes, polypyrroles, polyanilines, polyphenylenes, polypyrenes, polyazulenes, polynaphthalenes, polyphenylenevinylenes, polycarbazoles, polyindoles, poly azepines, polythiophenes, polyphenylenesulfides, polymerized conjugated carbonyls, polymerized conjugated amines, polynitroxyls, polyorganodisulfides, polythioethers, electroluminescent organic semiconductors, their derivatives, copolymers and combinations thereof. In some embodiments, the polymer chemistries and systems may be selected from those disclosed in co-pending PCT Application PCT/US2014/020874 entitled "Integrable redox-active polymer Batteries" which is incorporated herein by reference in its entirety, and particularly for the purpose of describing anode and cathode redox active polymers.

Still referring to FIG. 4, the first anode layer 110 and the second cathode layer 120 are both electronically conductive and ionically conductive. The electrolyte layer 130 is capable of conducting ions between the first anode layer 110 and the second cathode layer 120; however, electrolyte layer 130 is not capable of electronic conduction. In an embodiment, the first redox potential associated with the first anode layer 110 is lower than the second redox potential associated with the second cathode layer 120. For example, the difference in redox potential between the anode and cathode polymers may be selected to be greater than 0.1 volt, e.g., greater than 0.5 volt or greater than 1.0 volt. In some embodiments, the potential of the redox couples may be greater than 2 volts.

In an embodiment, the anode layer and cathode layer may comprise dopants to maintain charge neutrality and/or modify the electrical conductivity. In some embodiments, the redox polymer may be activated before or after assembly of the tag device. For example, the anode and cathode layers may be initially manufactured in a doped state. For other applications, the anode and cathode layers may be initially manufactured in an undoped, or discharged, state.

Still referring to FIG. 4, in an embodiment, the thickness of the anode layer 110 and cathode layer 120 may be less than 300 μm, the electrolyte layer 130 may be less than 100 μm. In some embodiments, the thickness of the anode layer 110 and cathode layer 120 may be less than 75 μm and the electrolyte layer 130 may be less than 50 μm and in some embodiments, less than 10 μm. For simplicity, the illustrated embodiment of FIG. 1 depicts a single anode layer 110, a single cathode layer 120 and a single electrolyte layer 130; however any suitable number of layers may be provided depending on the application. For example, the anode layer of a first cell is electrically connected to an anode layer of a second cell and the cathode layer 120 of the first cell is electrically connected to a cathode layer of a third cell. Such a configuration may be repeated any suitable number of times and numerous other arrangements are also possible, depending on the specifics of the device, apparatus or system. In some embodiments, a plurality of layers may be provided. Furthermore, single tag devices may be provided singularly or be further integrated with other films to form more complex tag devices.

Still referring to FIG. 4, the tag device 102 may further comprise a protective layer 160. The protective layer 160 may be a non-conducting polymer situated as the uppermost layer of the tag device 102. For example, the protective layer may comprise polyethylene, polypropylene, epoxy, polyester, derivatives or combinations thereof.

Still referring to FIG. 4, in some embodiments, the tag device 102 further comprises an adhesive layer 150 for affixing the tag device 102 to a parent object. In the illustrated embodiment of FIG. 4, the parent object 170 may be a product or collection of products to which the tag device 102 is affixed for the purpose of inventory control. For example, the tag device 102 may be affixed to an inventory storage bin 170. The product storage bin 170 may be stored in the presence of a radio-frequency electromagnetic field which continually energizes, or charges, the tag device 102. When the product bin 170 is moved from the transmitting radius of the radio-frequency electromagnetic field, the tag device 102 will continue to emit identification information while in transit. It may be appreciated that the stored electrochemical energy may be released over application-relevant time period. For example, the tag device 102 may be provided to emit identification information in the range of minutes to hours after being removed from the transmitting radius of the radio-frequency electromagnetic field. This time period can be altered based on the size, number of layers, redox-active polymer chemistry and desired operating conditions. As another example, an RFID tag device affixed to a product may remain active for a designed time period after scanning at a checkout counter, thus avoiding inventory loss. The time period the tag remains active may be set based on the charge density of the redox active polymer and/or the number of redox active polymer layers of the tag device. As yet another example, the tag device may comprise a conducting polymer with electroluminescent properties. The tag device may be designed to glow for a predetermined time period after exposure to a radio-frequency electromagnetic source.

In some embodiments, the tag device comprising a conducting polymer is configured to electrically connect two components of a parent object that otherwise may only be in nominal electrical contact. In some embodiments, the conductive tag devices have the advantage of being die-cut into simple electronic circuits that are valuable for connecting multiple electronic components by simple adhesion.

In some embodiments, the tag device may be designed to provide shielding from electromagnetic interference, electrostatic discharge, radio frequency interference or a combination thereof. For example, a thin layer tag device may prevent electromagnetic damage of a parent object to which it is affixed e.g. act as a simple Faraday cage. The tag device may be provided as an electrically conductive tape or adhesive employed as a low cost way to seal parent object components (e.g. automotive products) and simultaneously prevent electromagnetic and/or electrostatic damage to the parent object and/or parent object component to which the tag device is affixed. The effectiveness of electromagnetic interference shielding is measured by the attenuation of the tag device i.e. the ratio between field strength with and without the presence of the tag device. For example, the tag device may provide shielding greater than 10 dB. In some embodiments, the tag device may provide shielding greater than 50 dB.

The redox polymer systems may be selected based on a change in their properties due to environmental conditions. For example, the polymer film may be selected such that the charge transport processes within the film are significantly dependent on temperature i.e. the redox polymer resistance has strong dependence on temperature. Therefore one could build a simple circuit that records the temperature history of a product to which it's affixed which has utility for applications related to perishable goods. As another example, there may be a parametric relationship with relative humidity which may for example, be useful to sense the relative humidity history on electronics, etc.

Still referring to FIG. 4, in some embodiments, the tag device further comprises an auxiliary low power component (which may be a polymer itself or for example, a metal antenna or silicon ship). During a discharge process, energy is delivered to the low power component of the tag device. During discharge, an oxidation reaction takes place at the anode layer 110. The electrons produced in the oxidation process at the anode 110 may flow to a low power component associated with a low power component associated with the tag device and return to the cathode layer 120 to facilitate the reduction of the redox polymer at the cathode layer 120. The tag component may be selected from the group of a circuit, an antenna, a memory chip or a combination thereof. The stored energy is delivered to the low power tag component provided for the transmission of wireless signals. Or alternatively, the stored energy is delivered to the low power tag component provided for storage of identification information. Or alternatively, the stored energy is delivered to the low power tag component provided for signal processing, analysis of environmental conditions or other valuable electronic applications. In some embodiments, these components may be redox active polymers.

In an embodiment, the redox-active polymers may be provided as part of a composite tag device. A component of the composite may provide a structural feature, mechanical strength and/or a function relevant to tag device operation. Components of the composite may be formed of any suitable material (e.g. carbon, metal, glass and so on), any suitable shape (e.g. fibers, woven, whiskers, particles, porous matrix and so on), and may also provide any suitable function (e.g. mechanical strength, electrical conduction, ionic conduction, etc.). For example, the composite may comprise carbon fiber, fiber glass, metal whiskers, carbon particles, woven metals and or any other suitable material.

The tag device may be formed by a die-cutting manufacturing process wherein a shaped blade cuts a large polymer film sheet into smaller predetermined shapes, the large polymer film sheet comprising the first anode layer, the second cathode layer and the electrolyte layer. Other low cost film manufacturing approaches may be employed including roll-to-roll processing, roll slitting to cut a larger film or roll into smaller predetermined shapes, etc.

In an embodiment, additive manufacturing techniques may be employed to produce a tag device in virtually any shape. For example, a digital model of the tag device may be designed and successive layers may be laid down in a pattern corresponding to the model. For example, successive layers of an anode layer, an electrolyte layer, a cathode layer, may be formed by a plurality of nozzles associated with an additive manufacturing system.

An embodiment provides a method for manufacturing a tag device, wherein the method comprising a first step of providing an anode layer comprising a redox-active polymer film. An electrolyte layer comprising an ionically conductive polymer film for conducting ions may then be provided such that a first side of the ionically conductive polymer film contacts a first side of the anode layer. A cathode layer comprising a redox-active polymer film may then be layered such that the second side of the ionically conductive polymer contacts a first side of the cathode layer. The resulting tri-layer sheet may then be cut into smaller predetermined shapes.

In an embodiment, electrical circuit elements may be included or cut directly into the films. For example, the predetermined shapes may be any type of basic circuit element such as an antenna, a capacitor, a resistor, an inductor, a battery, an electroluminescent component and so on. Tag devices of varying complexity may be generated simply by layering multiple sheets of thin layers comprising conductive and/or redox-active polymers followed by die-cutting into the predetermined shape based on the desired application. As a simple example of a tag device 210 depicted in FIG. 5, a polymer battery 220 may comprise a battery element 220 comprising an anode layer, electrolyte layer and a cathode layer. The tag device 210 may further comprise an antenna element 230 which is shaped and adapted for the transmission of electromagnetic waves.

Figure 5:
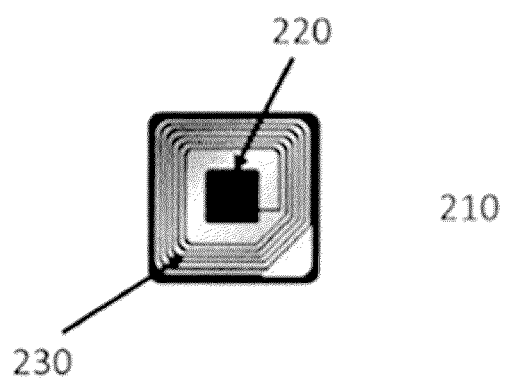
FIG. 5 is an illustration of a tag device having conductive polymers according to some other embodiments.

Still referring to FIG. 5, in some embodiments, the antenna element 230 is a single layer comprising a conductive and/or redox polymer. In such an embodiment, the battery element 220 and antenna element 230 may be manufactured separately according to a die-cutting process wherein the single layer antenna element 230 is die-cut from a larger single-layer sheet and battery element 220 is die-cut from a larger tri-layer sheet. Once the circuit elements have been separately formed, they may be contacted to compose the singular tag device. In other embodiments, the antenna element 230 may comprise an anode layer, electrolyte layer and a cathode layer. In such an embodiment, both the battery element 220 and circuit element 230 may be cut from a singular larger sheet in the predetermined shape of the tag device 210. It may be appreciated that die-cutting of thin film layers from larger sheets provides a simple, low-cost manufacturing process as opposed to, for example, specialized printing or other more complex manufacturing techniques.

In the following, an apparatus having conductive polymers according to some other embodiments comprising self-compensating polymers are described in reference to FIGS. 6(a)-12(b). As described above with respect to TABLE 1, only some pairs of redox-active polymers are technologically and economically feasible for forming the positive and negative electrodes of the electrochemical cells. For example, only some pairs have a voltage gap between a cathode with higher redox potential and an anode with lower redox potential that is large enough to be technologically and economically feasible. Thus, there is a need to increase the range of "pairable" redox-active polymers that can be used in the electrochemical cells. In the technology disclosed herein, embodiments can enable a wider range of possible cell voltages while still delivering high energy density of the cell.

Redox active polymers may be categorized based on the type of redox reactions the polymers are configured to undergo. One category includes n-type redox-active polymers, which can be configured to undergo a reversible redox reaction between a neutral state and a negatively charged state. Another category includes p-type redox-active polymers, which can be configured to undergo a reversible redox reaction between a neutral state and a positively charged state. Yet another category includes bipolar redox-active polymers, where a neutral state can be either reduced to a negatively charged state or oxidized to a positively charged state. In practice, bipolar redox active polymers are often effectively configured as n-type or p-type, depending on the particular operating potential of the electrode. In the electrochemical reduction reaction of n-type redox-active polymers, a cationic species may neutralize the negative charge; conversely, in the electrochemical oxidation reaction of p-type redox-active polymers, anions may neutralize positive charge.

Such redox active polymers can be used to form electrodes in battery cells. A common battery cell configuration employing redox-active polymers employ one electrode as a redox-active polymer paired to another electrode being a metal anode (usually lithium) to produce a battery cell sometimes known as a "rocking-chair" battery. As used herein and in the industry, a "rocking chair" battery cell, sometimes also referred to as a "swing" type battery cell, refers to a battery cell in which a single ionic charge transfer species (e.g. $Li^+$) can be transferred back and forth between a negative electrode and a positive electrode through an electrolyte during charge-discharge cycles. In one aspect, a "rocking chair" battery cell configuration can be advantageous in that the electrolyte serves as a conductor of the single ion species (e.g., cation such as Li+ or an anion), and a minimal amount of electrolyte serves to maximize the energy density of the entire cell. However, in other configurations in which two or more ionic charge transfer species are transferred between the electrodes, for example in configurations where an n-type negative electrode polymer is paired to a p-type positive electrode, a greater amount of electrolyte may be used to provide sufficient amounts of both anionic species and cationic species to compensate i.e. neutralize the charge at both electrodes, while still delivering sufficient ionic conductivity. Not only does this lower the energy density of the entire cell, but the electrolyte can experience a significant concentration gradient on charge-discharge cycling. The pairing of an n-type redox-active polymer (e.g. anode) with a p-type redox active polymer (e.g. cathode) can present a significant challenge because to cycle the battery, the electrolyte contains both 1) cations to compensate for the charge associated with redox process of the n-type polymer switching between a neutral and anionic state, and 2) anions to compensate for the charge associated with the redox process of the p-type polymer switching between a neutral and cationic state. This issue is noted by those skilled in the art (see for example Song et. al, Energy & Environmental Science, 2013, 6, 2280-2301).

This issue may be further clarified by way of the following example approximations of a typical volume of electrolyte that may be used to pair an n-type negative electrode polymer to a p-type positive electrode. By way of an illustrative example only, the molecular mass of an example anode redox active system including an n-type polyanthraquinone (PAQ) can be, for example, 208 g/mol. Such an example anode redox active system can be coupled to an example cathode system including a p-type phenothiazine, which can have a molecular mass of 198.3 g/mol. Assuming that the density of the polymerized film is 1.2 g/ml, the molar volume can be estimated to be on the range of about 150-200 $cm^3$/mol (e.g. phenothiazine is 165.25 $cm^3$/mol; PAQ is 173.33 $cm^3$/mol). Assuming two electrons per redox center, the molarity of the polymer electrode is on the order of 10 M (e.g. phenothiazine at 12.1 M; PAQ at 11.54 M). For charge balance resulting in 1 mol of ions for every mole of charge, 12 mols of salt can be used for 1 L of each electrode. Common electrolyte concentrations are between 0.3 M and 1 M electrolyte which translates to about 40 L of electrolyte to balance the charge (i.e. 12 mol at 0.3 M); 12 mol at 1 M is 12 L. This suggests storing the mobile cation $Li^+$ in the anode can result in as much as 15% volume increase and storing the mobile anion $ClO_4^-$ in the cathode can result in as much as 37% volume increase, ultimately consuming the electrolyte from the solvent. Based on the inventors' analysis, pairing certain n-type anode and a certain p-type cathode may not be desirable for reasons related to the relatively large volume changes, high electrolyte volume requirements and large charge gradients, among other reasons. Thus, there is a need for redox-active polymer electrodes that does not suffer from such undesirable characteristics associated with the volume changes.

Advantageously, by employing one of various embodiments of electrochemical cells described herein, relatively small volume changes, relatively low electrolyte volume requirements and relatively small charge gradients. In embodiments, the ratio of (molarity of charge balancing mobile ions in the electrolyte)/(molarity of negative electrode active charge centers+molarity of positive electrode active charge centers) may be <1, e.g., 0.1 to 0.4, 0.4 to 0.7 or 0.7 to 0.9, in a self-compensated cell.

The disclosed technology relates to methods of pairing redox-active polymer electrodes in a "rocking-chair" type cell, regardless of the type (i.e., n or p type) of the electrodes, and devices having such paired electrodes. That is, the disclosed technology advantageously enables battery cells in which both electrodes comprise redox-active polymers, while the electrolyte contains a single mobile ionic species (i.e., anionic or cationic species) that compensate for the charge associated with either or both of the electrodes. Thus, the need for one ionic species (e.g., a mobile cationic species) to compensate for the charge associated with the redox process of one of the electrodes (e.g., n-type polymer of an anode switching between a neutral and anionic state) and another ionic species (e.g., a mobile anionic species) to compensate for the charge associated with the redox process of another one of the electrodes (e.g., p-type polymer of a cathode switching between a neutral and cationic state). It will be appreciated that this opens up the flexibility and range of "pairable" redox-active polymers, in effect delivering a wider range of possible cell voltages while still delivering high energy density of the cell. In addition to providing a "rocking-chair" battery regardless of the type of redox-active polymers that are paired, the volume of electrolyte is significantly reduced, potentially approaching 40% and alleviating any stability issues of the cell relating to large charge gradients associated with shuttling both mobile cations and mobile anions between the electrodes and electrolyte.

In one aspect, the present disclosure solves a limitation in pairing p-type and n-type polymers in an electrochemical cell by incorporating redox-active polymers capable of forming zwitterions. As described herein, a zwitterion refers to a molecule that has at least one positive, i.e. cationic charge center and at least one negative, i.e. anionic, charge center that exist simultaneously in the same molecule, such that the molecule as a whole can be in a net charge-neutral state, referred to herein as a zwitterionic state. It will be appreciated that in zwitterions, a charged atom is bonded to an adjacent atom by one or more covalent bonds, which is distinguishable from a charged atom of a non-zwitterion such as, e.g., an ionic molecule (e.g., NaCl and $NH_4Cl$) that is not covalently bonded. Furthermore, in zwitterions, atoms having opposite charges are not immediately adjacent to one another. When a charge imbalance is created between the at least one positive charge center and the at least one negative charge center, the zwitterion can be in a net charged state, referred to herein as a non-zwitterionic state. In a non-zwitterionic state, the net charge of the zwitterion can be balanced by an extrinsic charged atom or molecule, e.g., a mobile cation or a mobile anion.

As commonly understood in the industry, a polymer comprises a sequence or a chain of repeating groups of atoms linked to each other by primary, e.g., covalent bonds. As used herein, a polymer unit refers to a segment of the polymer chain, e.g., one or more groups of atoms that can be repeated to form longer chains. In various embodiments, a polymer comprises two or more such groups of atoms and can comprise as few as two such groups (i.e., a dimer), and a polymer unit can comprise as few as one group (i.e., a monomer). As used herein, "self-compensating" refers to a charge compensating mechanism in a polymer unit whereby, during a charge-discharge cycle of a battery cell comprising the polymer unit in an electrode, a change in the charge state of the polymer unit, which may result from switching between redox states (i.e. by gaining or losing one or more electrons), is internally compensated within the polymer unit itself. In contrast, in non-self-compensating polymers, a change in the charge state of a polymer unit may be compensated not within the polymer unit itself but through one or more mobiles ion from outside of the polymer unit itself, e.g., from the electrode of opposite polarity and/or the electrolyte material. In various embodiments, some self-compensating polymer units are configured to form a zwitterion, which may be referred to herein as zwitterionic polymer units.

A distinction between a self-compensating n-type polymer unit and a non-self-compensating n-type polymer unit is illustrated via FIGS. 6(a)-6(b) and 7(a)-7(b). Referring to the negative electrode 312 illustrated in FIGS. 6(a) and 6(b), during a charge-discharge cycle of a battery cell 310a/310b having a non-self-compensating n-type polymer unit 314a/314b, the n-type polymer unit 314a/314b undergoes a redox reaction between a neutral state 314b and a negatively charged anionic state 314a. The n-type polymer unit 314a/314b in the anionic (i.e., negatively charged) state 314a may be compensated by a mobile cation (e.g., $M^+$ in the negative electrode 312 of FIGS. 6(a) and 6(b)). In comparison, referring to the negative electrode 332 illustrated in FIGS. 7(a) and 7(b), during a charge-discharge cycle of a battery cell 330a/330b having a self-compensating n-type polymer unit 334a/334b, comprising e.g., a zwitterionic polymer unit according to some embodiments, the n-type polymer unit 334a/334b switches between a cationic state 334b and a "net neutral" state 334a, where the "net neutral" state comprises a zwitterionic state. In the zwitterionic state, a negative charge of the redox center (e.g. oxygen in anthraquinone) is compensated by the positive charge center (e.g. $R_4N^+$) within the polymer unit itself, thus being internally "self-compensated." That is, in the zwitterionic state, the n-type polymer unit 334a/334b forms a charge-neutral unit without a mobile cation as in FIGS. 6(a) and 6(b). In the cationic state 334b (i.e. non-zwitterionic state), the positive charge center (e.g. $R_4N^+$) of the polymer is compensated by a mobile anion (e.g., $A^-$ in the negative electrode of FIGS. 7(a)-7(b)).

A distinction between a self-compensating p-type polymer unit and a non-self-compensating p-type polymer unit is illustrated via FIGS. 6(a)-6(b) and 7(a)-7(b). Referring to the positive electrode 336 illustrated in FIG. 7(a)-(b), during a charge-discharge cycle of a battery cell 330a/330b having a non-self-compensating p-type polymer unit 338a/338b, the p-type polymer unit 338a/338b undergoes a redox reaction between a neutral state 338b and a positively charged cationic state 338a. The p-type polymer unit in the cationic (i.e., positively charged) state 338a may be compensated by a mobile anion (e.g., $A^-$ in the positive electrode of FIGS. 7(a)-7(b)). In comparison, referring to the positive electrode 316 illustrated in FIGS. 6(a)-6(b), during a charge-discharge cycle of a battery cell having a self-compensating p-type polymer unit 318a/318b comprising a zwitterionic polymer unit according to some embodiments, the p-type polymer unit 318a/318b switches between an anionic state 318b and a "net neutral" state 318a at the "molecular level," where the "net neutral" state 318a comprises a zwitterionic state. In the zwitterionic state, a positive charge of the redox center (e.g. $S^+$ in thianthrene) is self-compensated by the negative charge center (e.g. $SO_3^-$) within the polymer unit 318a/318b itself, thus being "self-compensated." That is, in the zwitterionic state, the p-type polymer unit 318a/318b forms a charge-neutral unit without a mobile anion as in FIGS. 7(a) and 7(b). In the anionic state (i.e. non-zwitterionic state), the negative charge center (e.g. $SO_3^-$) of the polymer is compensated by a mobile cation (e.g., $M^+$ in the positive electrode of FIGS. 6(a)-6(b)).

In one aspect, various embodiments disclosed herein provides for an electrochemical energy storage device comprising a negative electrode redox-active polymer film capable of being oxidized during a discharging operation. The electrochemical energy storage device further comprises a positive electrode redox-active polymer film capable of being reduced during a discharging operation. For the purposes of the following description, the term "negative electrode" may be used interchangeably with the term "anode" or "anodic layer" and, "positive electrode" may be used interchangeably with the term "cathode" or "cathodic layer" to distinguish between the electrodes of the electrochemical energy storage device. As described herein, an anode refers to an electrode at which an oxidation reaction occurs thereby producing electrons during a discharge operation, and at which a reduction reaction occurs consuming electrons during a charge operation. Conversely, a cathode refers to an electrode at which a reduction reaction occurs consuming electrons during a discharge operation, and at which an oxidation reaction occurs thereby producing electrons during a charge operation. The negative electrode redox-active polymer is characterized by a first redox potential and the positive electrode redox-active polymer is characterized by a second redox potential which is greater than the first redox potential. The negative electrode active material and the positive electrode active material are both electronically conductive and ionically conductive.

In various embodiments described herein, electrodes of an electrochemical storage device have redox-active polymer, at least one of which comprises a polymer unit, referred to herein as a zwitterionic polymer unit, that is configured to form a zwitterionic state in which charge is self-compensated. As described above, above, the zwitterionic polymer unit can be "self-compensated," which refers to a state of a polymer unit whereby, the charge state of the polymer unit, which may result from switching between redox states (i.e. by gaining or losing one or more electrons), is internally compensated within the polymer unit itself. As described above, a zwitterionic polymer unit is configured to form a zwitterionic state, wherein the polymer unit can internally maintain electroneutrality stably by having both cationic and anionic charge centers that exist within the polymer unit simultaneously. The zwitterionic polymer unit can alternatively be in a stable non-zwitterionic state (i.e. cationic or anionic state), in which a charge of the polymer unit is compensated by a mobile counterion species. Unlike the zwitterionic state, in the non-zwitterionic state, the mobile counterion migrates to and from the opposite electrode through an electrolyte material, e.g., an electrolyte layer, situated between the negative electrode and positive electrode, for example in a separator.

In various embodiments disclosed herein, an electrochemical energy storage device comprises an anode comprising a negative electrode active material including a negative electrode redox-active polymer and configured to be oxidized during a discharging operation. The device additionally comprises a cathode comprising an active material including a redox-active polymer and configured to be reduced during the discharging operation. The device further comprises an electrolyte material interposed between the negative electrode active material and the positive electrode active material, the electrolyte material comprising an ionically conductive polymer and configured to conduct mobile counterions therethrough between the negative electrode and positive electrode active materials. At least one of the negative electrode redox-active polymer and the positive electrode redox-active polymer comprises a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by one or more of the mobile counterions.

In some embodiments where one of the negative electrode redox-active polymer or the positive electrode redox-active polymer comprises a zwitterionic polymer unit, the other of the negative electrode redox-active polymer or the positive electrode redox-active polymer does not include a zwitterionic polymer unit.

In various embodiments disclosed herein, the electrolyte material comprises an ionically conductive polymer film for conducting mobile counterions between the negative electrode and the positive electrode. The counterion species migrate in and out of the bulk of the polymer and between the negative electrode and positive electrode during a discharge operation. In some embodiments, a charging operation may be performed such that the negative electrode redox-active polymer film is reduced and the positive electrode redox-active polymer film is oxidized. Exemplary embodiments of various cell configurations will now be described to illustrate the various configurations and electrochemical processes.

Figure 6A:
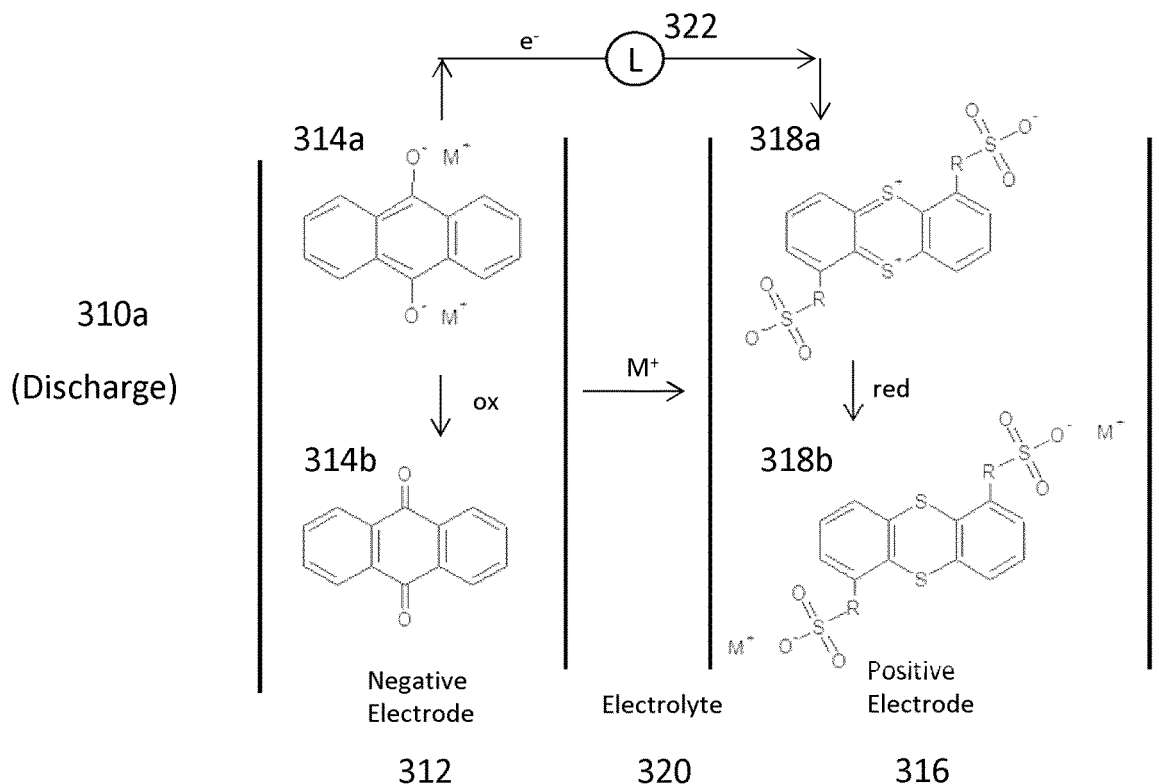
FIGS. 6(a) and 6(b) depict an electrochemical cell comprising a negative electrode comprising an n-type polymer and a positive electrode comprising a self-compensated p-type polymer which includes a zwitterionic polymer unit, undergoing electrochemical redox processes during (a) a discharge operation and (b) a charge operation, respectively, according to some embodiments.
Figure 6B:
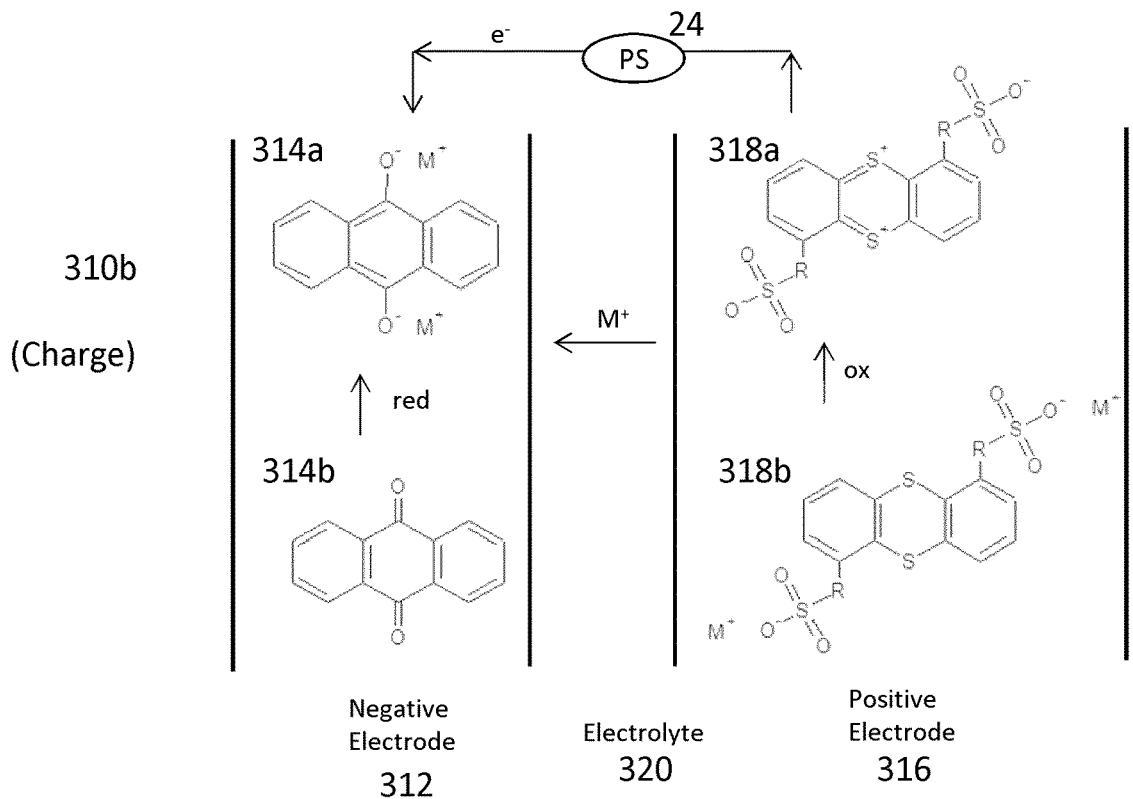

In a first embodiment, an electrochemical energy storage device comprises an anode comprising a negative electrode active material including a negative electrode redox-active polymer and configured to be oxidized during a discharging operation, wherein the negative electrode redox-active polymer is an n-type polymer. The device further comprises a positive electrode active material comprising a positive electrode redox-active polymer and configured to be reduced during the discharging operation. The positive electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device further comprises an electrolyte material interposed between the negative electrode active material and positive electrode active material, the electrolyte material comprising an ionically conductive polymer and configured to conduct the mobile cationic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the positive electrode active material towards the negative electrode active material during the charging operation. The first embodiment is described in detail with respect to FIGS. 6(a) and 6(b). FIGS. 6(a) and 6(b) depict an electrochemical cell 310a/310b comprising a negative electrode 312 comprising an n-type polymer unit 314a/314b and a positive electrode 316 comprising a self-compensated p-type polymer unit 318a/318b which includes a self-compensating zwitterionic polymer unit, undergoing electrochemical redox processes during (a) a discharge operation and (b) a charge operation, respectively, according to some embodiments.

Referring to the discharge process depicted in FIG. 6(a), the n-type polymer 314a/314b comprises a negative electrode redox active polymer and is configured to be oxidized from an anionic state 314a towards a neutral state 314b. As electrons flow from the negative electrode 312 to the positive electrode 316 through an external circuit to power the a load 22 (L), mobile cations $M^+$ migrate out of the bulk of the negative electrode n-type polymer unit 314a/314b towards the positive electrode through an electrolyte material 320 interposed between the negative electrode 312 and positive electrode 316. The positive electrode 316 comprises a self-compensated redox-active polymer which during a discharge operation, may be reduced from a zwitterionic state 318a towards an anionic state 318b while charge compensation is facilitated by the mobile counterion $M^+$.

Referring to FIG. 6(b), during a charge process, the n-type polymer 314a/314b comprising the negative electrode redox active polymer is configured to be reduced from the neutral state 314b towards the anionic state 314a, wherein charge compensation is facilitated by the mobile counterion $M^+$ migrating out of the bulk of the positive electrode 316 comprising the self-compensated p-type polymer unit 318a/318b towards the negative electrode 312 through the electrolyte 320. Electrons flow from the positive electrode 316 to the negative electrode 312 via an external power source 24 (PS). During the charge process, the positive electrode 316 comprising the p-type polymer unit 318a/318b including the self-compensating zwitterionic polymer unit is oxidized from the anionic state 318b to the zwitterionic state 318a, wherein the charge is compensated internally within the polymer unit itself via "self-compensation."

Figure 7A:
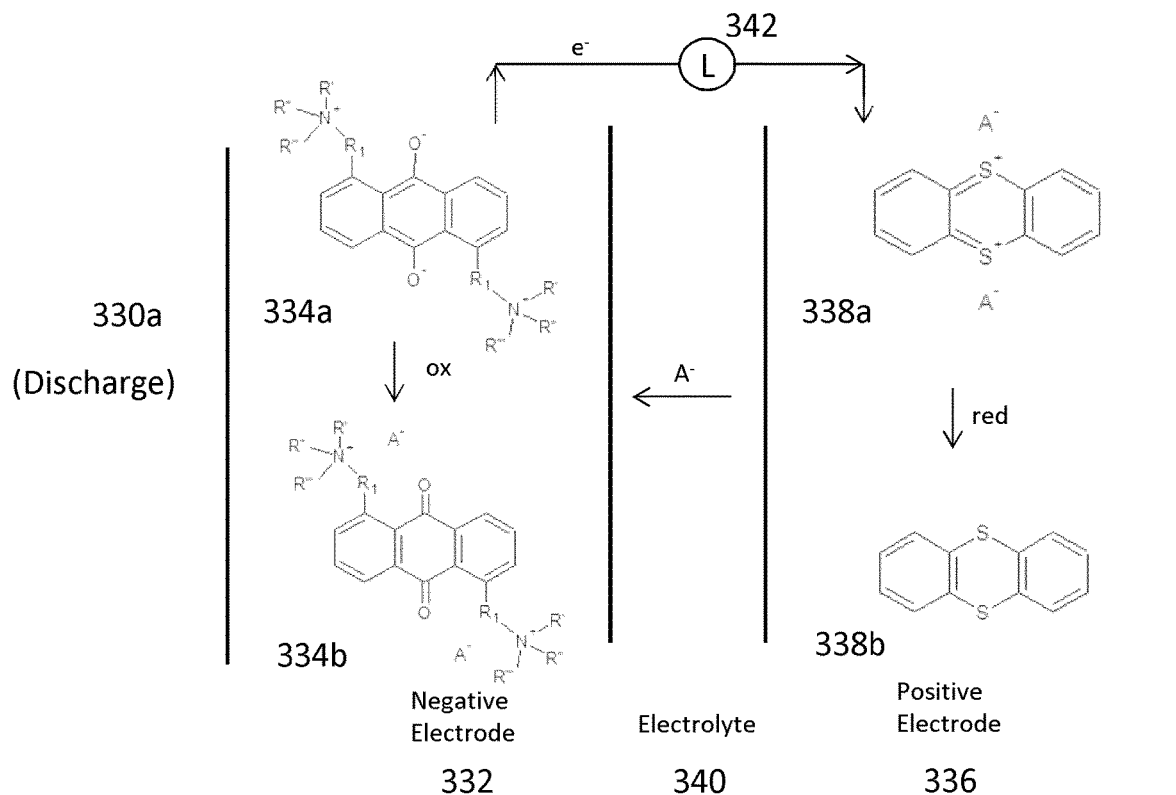
FIGS. 7(a) and 7(b) depict an electrochemical cell comprising a negative electrode comprising a self-compensated n-type polymer including a zwitterionic polymer unit and a positive electrode with a p-type polymer, undergoing electrochemical redox processes during (a) a discharge operation and (b) a charge operation, respectively, according to some other embodiments.
Figure 7B:
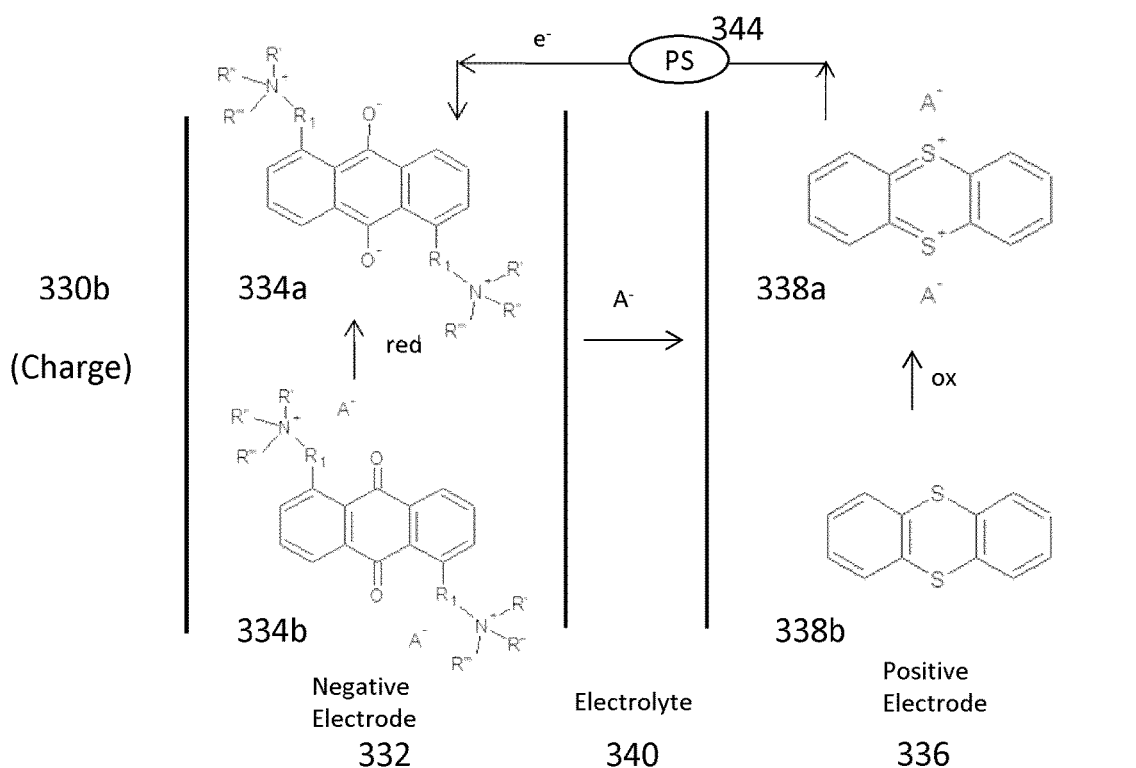

In a second embodiment, an electrochemical energy storage device comprises an anode comprising a negative electrode active material including a negative electrode redox-active polymer and configured to be oxidized during a discharging operation, wherein the negative electrode redox-active polymer is an n-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile anionic species in the cationic state. The device additionally comprises a positive electrode active material comprising a positive electrode redox-active polymer and configured to be reduced during the discharging operation, wherein the positive electrode redox-active polymer is a p-type polymer. The device further comprises an electrolyte material interposed between the negative electrode active material and positive electrode active material, the electrolyte material comprising an ionically conductive polymer and configured to conduct the mobile anionic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile anionic species from the positive electrode active material towards the negative electrode active material during the charging operation. The second embodiment is described in detail with respect to FIGS. 7(a) and 7(b). FIGS. 7(a) and 7(b) depict an electrochemical cell 330a/330b comprising a negative electrode 332 comprising a self-compensated n-type polymer unit 334a/334b including a zwitterionic polymer unit and a positive electrode 336 with a p-type polymer, undergoing electrochemical redox processes during (a) a discharge operation and (b) a charge operation, respectively, according to some other embodiments.

Referring to the discharge process depicted in FIG. 7(a), the self-compensated n-type polymer unit 334a/334b including the zwitterionic polymer unit is configured to be oxidized from a neutral zwitterionic state 334a towards a cationic state 334b and charge compensation is facilitated by the mobile counter-anion $A^-$. As electrons flow from the negative electrode 332 to the positive electrode 336 through an external circuit to power a load 342 (L), the mobile anions $A^-$ migrate out of the bulk of the positive electrode 38 comprising the p-type polymer towards the negative electrode 332 through an electrolyte material 340. The positive electrode 336 comprises the p-type polymer comprising a redox-active polymer unit 338a/338b that is configured to be reduced from a cationic state 338a towards a neutral state.

Referring to FIG. 7(b), during a charge process, the n-type polymer unit 334a/334b comprising the redox-active polymer is configured to be reduced from the cationic state 334b to the neutral zwitterionic state 334a, wherein charge is compensated internally within the polymer unit itself via "self-compensation." The positive electrode 336 comprises a p-type redox active polymer unit 338a/338b that is configured to be oxidized from the neutral state 338b to the cationic state 338a wherein charge compensation is facilitated by the mobile counterion $A^-$ migrating out of the bulk of the negative electrode 332 comprising the n-type polymer through the electrolyte 340. Electrons flow from the positive electrode 336 to the negative electrode 332 via an external power source 344 (PS).

Figure 8A:
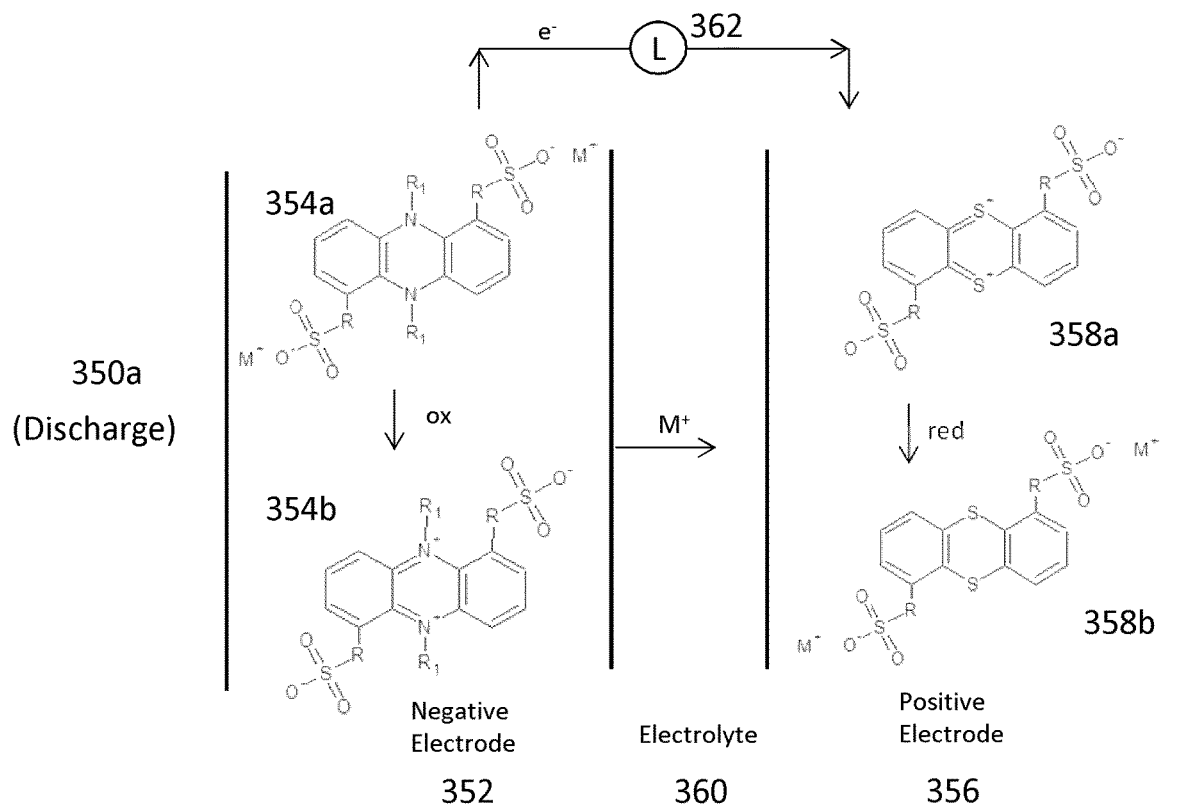
FIGS. 8(a) and 8(b) depict an electrochemical cell comprising a negative electrode comprising a first self-compensated p-type polymer including a first zwitterionic polymer unit and a positive electrode comprising a second self-compensated p-type polymer including a second zwitterionic polymer unit, undergoing electrochemical redox processes during (a) a discharge operation and (b) a charge operation, respectively, according to yet some other embodiments.
Figure 8B:
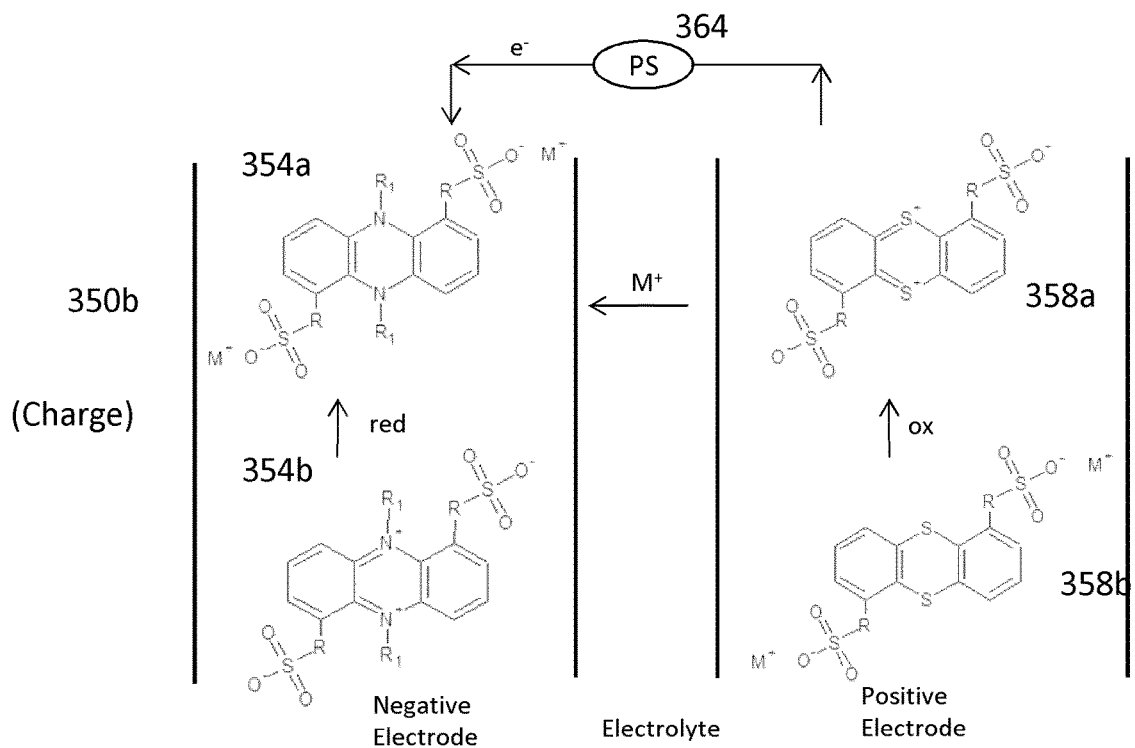

In a third embodiment, an electrochemical energy storage device comprises an anode comprising a negative electrode active material including a negative electrode redox-active polymer and configured to be oxidized during a discharging operation, wherein the negative electrode redox-active polymer is a p-type polymer comprising a zwitterionic polymer unit configured to reversibly switch between a zwitterionic state in which the zwitterionic polymer unit has first and second charge centers having opposite charge states that compensate each other, and a non-zwitterionic state in which the zwitterionic polymer unit has one of the first and second charge centers whose charge state is compensated by a mobile cationic species in the anionic state. The device additionally comprises a cathode comprising a positive electrode active material including a redox-active polymer and configured to be reduced during the discharging operation, wherein the positive electrode redox-active polymer is a p-type polymer comprising a zwitterionic polymer unit configured to reversibly switch between a zwitterionic state in which the zwitterionic polymer unit has third and fourth charge centers having opposite charge states that compensate each other, and a non-zwitterionic state in which the zwitterionic polymer unit has one of the third and fourth charge centers whose charge state is compensated by the mobile cationic species in the anionic state. The device further comprises an electrolyte material interposed between the negative electrode active material and the positive electrode active material, the electrolyte material comprising an ionically conductive polymer configured to conduct the mobile cationic species therethrough from the negative electrode active material to the positive electrode active material during the discharging operation. In some embodiments, the negative electrode active material is further configured to be reduced during a charging operation, the positive electrode active material is further configured to be oxidized during the charging operation, and the electrolyte material is further configured to conduct the mobile cationic species from the positive electrode active material towards the negative electrode active material during the charging operation. The third embodiment is described in detail with respect to FIGS. 8(a) and 8(b). FIGS. 8(a) and 8(b) depict an electrochemical cell comprising a negative electrode 352 comprising a first self-compensated p-type polymer unit 354a/354b including a first zwitterionic polymer unit and a positive electrode 356 comprising a second self-compensated p-type polymer unit 358a/358b including a second zwitterionic polymer unit, undergoing electrochemical redox processes during (a) a discharge and (b) a charge operation, respectively, according to yet some other embodiments.

Referring to the discharge process depicted in FIG. 8(a), the first self-compensated p-type polymer unit 354a/354b of the negative electrode 352 is configured to be oxidized from an anionic state 354a to a neutral zwitterionic state 354b, wherein charge is compensated by mobile counterion $M^+$. As electrons flow from the negative electrode to the positive electrode through an external circuit to power a load 362 (L), mobile cations $M^+$ (e.g. $H^+$, $Li^+$) migrate out of the bulk of the negative electrode 352 towards the second p-type polymer 358a/358b of the positive electrode 356 through the electrolyte material 360 interposed between the negative electrode 352 and positive electrode 356. The second p-type polymer 354a/354b of the positive electrode 356 is configured to be self-compensated as it is reduced towards the anionic state 358b while charge compensation is facilitated by the mobile counterion $M^+$.

Referring to the charge process depicted in FIG. 8(b), the first self-compensated p-type polymer unit 354a/354b of the negative electrode 352 is reduced from a neutral zwitterionic state 354b towards the anionic state 354a, wherein charge compensation is facilitated by the mobile counterion $M^+$ migrating out of the bulk of the positive electrode 356 p-type polymer towards the negative electrode 352 through the electrolyte material 360. Electrons are conducted from the positive electrode to the negative electrode via an external power source 364 (PS).

The present disclosure facilitates the pairing of any p-type and n-type polymers in an electrochemical cell by incorporating any redox-active polymer configured to form a zwitterionic into at least one of the p-type and n-type polymers. Thus, a wide range of redox-active polymers may be employed. Furthermore, providing certain zwitterionic polymer units allows one to tune the system specifically for redox potential.

Advantageously, in various embodiments of electrochemical energy storage devices (e.g., battery cells) the mobile counterion comprise a single mobile ionic species that compensates charge states associated with non-zwitterionic states of one or both of the negative electrode redox-active polymer and the positive electrode redox-active polymer. Thus, the need for one ionic species (e.g., a mobile cationic species) to compensate for the charge associated with the redox process of one of the electrodes (e.g., n-type polymer of an anode switching between a neutral and anionic state) and another ionic species (e.g., a mobile anionic species) to compensate for the charge associated with the redox process of another one of the electrodes (e.g., p-type polymer of a cathode switching between a neutral and cationic state). That is, when a mobile cationic species is present, mobile anionic species may not be present, while when a mobile anionic species is present, mobile cationic species may not be present. These characteristics enable a substantial reduction in volume changes, as described above.

In some embodiments, the negative electrode redox-active polymer has a first redox potential and the positive electrode redox-active polymer has a second redox potential greater than the first redox potential by greater than about 200 mV, greater than about 600 mV, or greater than about 1V.

In some embodiments, the negative electrode active material and the positive electrode active material each has an electrical conductivity greater than about $10^{-6}$ S/cm, greater than about $10^{-4}$ S/cm, or greater than about $10^{-3}$ S/cm.

In some embodiments, the negative electrode active material and the positive electrode active material each has an ionic conductivity greater than about greater than about $10^{-6}$ S/cm, greater than about $10^{-4}$ S/cm, or greater than about $10^{-3}$ S/cm.

In some embodiments, the zwitterionic polymer unit comprises a structural group comprising a repeating heterocyclic aromatic structure including two heteroatoms para to each other, wherein each of the heteroatoms is selected from the group consisting of oxygen (O), carbonyl, sulfur (S), nitrogen (N), and functionalized N.

In some embodiments, the heterocyclic aromatic structure further comprises a compensating substituent, such that the heteroatoms and the compensating substituent forms the first and second charge centers having opposite charge states that compensate each other.

In some embodiments, the compensating substituent has relatively high ratio of electron withdrawing character or electron-donating character to substituent mass. Not to be bound by any particular theory, but the electron withdrawing character may, for example, be informed by a particular substituent's Hammett parameter. The Hammett parameter is an empirical electronic substituent parameter which describes observed electronic effects (inductive and resonance electronic effects) that a substituent imparts to a conjugated structure. The Hammett parameter is positive if it is electron withdrawing or negative if it is electron donating.

For example, one may calculate the ratio of Hammett parameter to molecular weight of a substituent as in the table below:

| Substituent | Hammett parameter | Molecular weight | Ratio |
|---|---|---|---|
| NO | 0.91 | 26 | 0.035 |
| CN | 0.66 | 26.01 | 0.02537486 |
| N(CH3)3+ | 0.82 | 44.06 | 0.01861099 |
| NO2 | 0.78 | 46 | 0.01695652 |
| CHO | 0.42 | 29.02 | 0.01447278 |
| COCH3 | 0.5 | 43.05 | 0.0116144 |
| CO2H | 0.45 | 45.02 | 0.00999556 |
| CF3 | 0.54 | 69.01 | 0.00782495 |
| Cl | 0.23 | 35.45 | 0.00648801 |
| SH | 0.15 | 33.11 | 0.00453035 |
| SO3 | 0.35 | 80 | 0.004375 |
| F | 0.06 | 19 | 0.00315789 |
| Br | 0.23 | 79.9 | 0.0028786 |
| CH2Cl | 0.12 | 61.49 | 0.00195154 |
| I | 0.18 | 126.9 | 0.00141844 |
| H | 0 | 1.01 | 0 |
| SCH3 | 0 | 35.13 | 0 |
| NHCHO | 0 | 44.03 | 0 |
| C6H5 | −0.01 | 77.11 | −0.0001297 |
| H2C=CH | −0.02 | 27.05 | −0.0007394 |
| Si(CH3)3 | −0.07 | 73.09 | −0.0009577 |
| C5H11 | −0.15 | 71.16 | −0.0021079 |
| NHCOCH3 | −0.15 | 58.06 | −0.0025835 |
| n-C4H9 | −0.16 | 57.13 | −0.0028006 |
| n-C3H7 | −0.13 | 43.1 | −0.0030162 |
| i-C3H7 | −0.15 | 43.1 | −0.0034803 |
| t-C4H9 | −0.2 | 57.13 | −0.0035008 |
| C2H5 | −0.15 | 29.07 | −0.00516 |
| OCH2CH3 | −0.24 | 44.06 | −0.0054471 |
| OCH3 | −0.27 | 31.04 | −0.0086985 |
| CH3 | −0.17 | 15.04 | −0.0113032 |
| N(CH3)2 | −0.83 | 44.06 | −0.0188379 |
| OH | −0.37 | 17.01 | −0.0217519 |
| NH2 | −0.66 | 16.02 | −0.0411985 |

In some embodiments, the ratio of Hammett parameter to molecular weight of a substituent is between about 0.05 and about −0.05. In some other embodiments, the ratio of Hammett parameter to molecular weight of a substituent is less than about 0.05 or greater than about −0.05.

In some embodiments, the ratio of electron withdrawing character to substituent mass is selected to be between about 0 and about 0.10, or between about 0 and about 0.05. In some embodiments, the ratio of electron donating character to substituent mass is selected to be between about 0 and about −0.10, or between about 0 and about −0.05.

In some embodiments, the compensating substituent is selected to form a charge stabilizing structure. In an embodiment, R of the compensating substituent may be selected to form a six-membered ring in the zwitterionic compensated structure, thereby imparting stability. For example, if the heteroatom is located within the in ring structure (e.g. phenothiazine, thianthrene, phenazine) R should be at least two carbon atoms. As another example, or heteroatom outside of ring (e.g. quinone structures) R should be at least one carbon as depicted below:

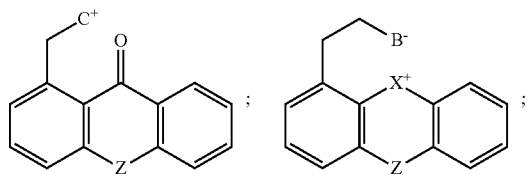

The compensating substituent can be selected such that it remains in the charge state (either anionic or cationic) during battery cycling so that the redox active center remains as the heteroatom. In embodiments where the compensating substituent is configured to form an anionic species, a redox potential corresponding to a transition of the compensating substituent from an anionic to a neutral state is selected to be greater than the a redox potential corresponding to a transition of the heteroatom from a neutral to a cationic state. In embodiments where the compensating substituent is configured to form a cationic species, a redox potential corresponding to a transition of the compensating substituent from a cationic to a neutral state is selected to be less than a redox potential corresponding to a transition of the heteroatom from a neutral state to an anionic state.

The redox active polymer is capable of forming a quinoid species with any suitable electron-withdrawing or electron-donating group R1 or R2 and polymerized either in the main chain or as a pendant group:

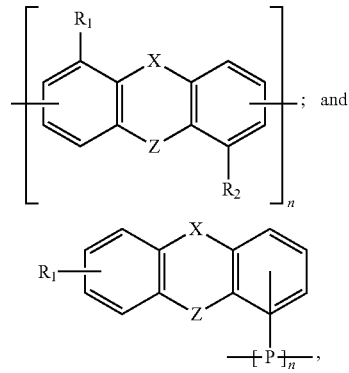

where n is the number of repeated subunits of the polymer having a value between about 1 to about 100,000, between about 10 and about 50,000, or between about 25 and about 10,000; P is a suitable conductive polymer backbone, for example, polyphenylene, polypyrrole, polythiophene, polyaniline, polyacetylenederivative or combinations thereof.

In some embodiments, the at least one of the redox-active polymers comprise a structural group selected from the group consisting of quinones, phenothiazines, N-functionalized phenothiazines, thianthrenes, phenozines, phenoxazine, phenoxathiin, dihydrophenazine, dialkyldihydrophenazine, dibenzodioxin, benzofurans, benzodifurans, imides, phthalimides, N-functionalized pthalimides, their derivatives and combinations thereof.

In some embodiments, the zwitterionic polymer unit comprises a structural group selected from the group consisting of:

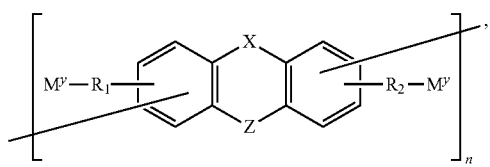

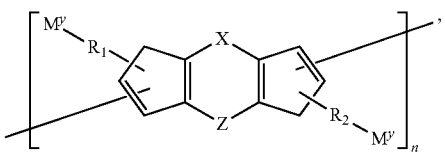

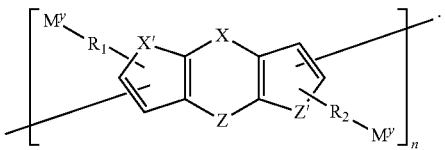

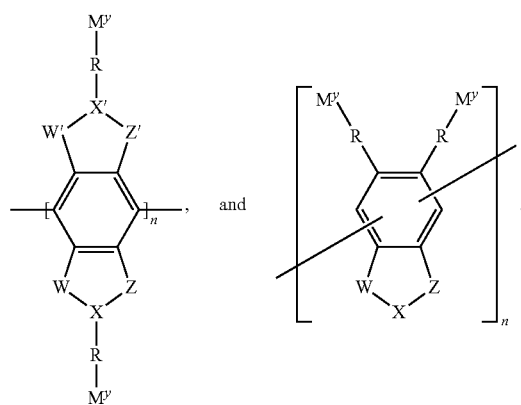

As described herein, a heteroatom (e.g., N, S) that is functionalized refers to a heteroatom having a charge-compensating molecule, referred to herein as a charge compensating substituent, attached thereto. As an example, the nitrogen atom of N—$(CH_2)_n$—$PO_3$ is a functionalized heteroatom, and $(CH_2)_n$—$PO_3$ is the charge compensating substituent. In various embodiments, the heteroatoms and the compensating substituent can form first and second charge centers having opposite charge states that compensate each other.

In these embodiments, W, W', X, X', Z and Z' are heteroatoms independently selected from the group consisting of oxygen, carbonyl, nitrogen, functionalized nitrogen and sulfur, M is an anion or cation selected from the group consisting of sulfate, phosphate, phosphonate, carboxylate, ammonium, halogenide, sulfonate, hydroxamate, trifluoroborate, acetate, imide, perchlorate, borate, nitro, halogen, cyano, sulfonyl, cyanate, isocyano, sulfonium, phosphonium, carbanion and carborane, and R1 and R2 are independently selected from the group consisting of hydrogen, linear or branched and saturated or unsaturated C1-C6 alkyl or ether chain.

In some embodiments, the zwitterionic polymer unit comprises a structural group selected from the group consisting of:

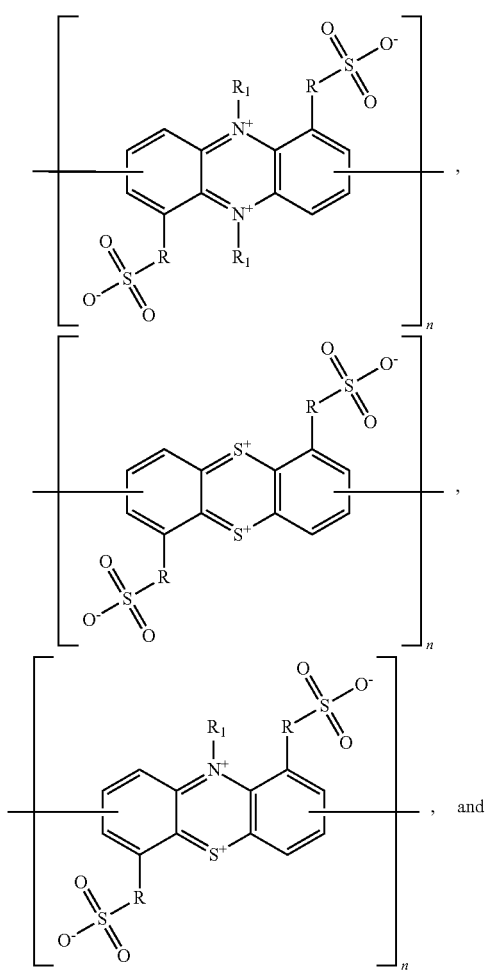

In these embodiments, each of R, $R_1$, R', R" and R'" is a hydrogen atom or one of a C1-C6 alkyl chain or a C1-C6 ether chain that is linear or branched and saturated or unsaturated;, and wherein n is the number of repeated subunits of the polymer having a value between about 1 to about 100,000, between about 10 and about 50,000, or between about 25 and about 10,000.

In some embodiments, the zwitterionic polymer unit comprises a structural group selected from the group consisting of a $PO_3$-compensated phenothiazine polymer, a $PO_3$-compensated phenothiazine-aniline copolymer, a $PO_3$-compensated phenothiazine-thiophene block copolymer, a $PO_3$-compensated phenothiazine-thiophene random copolymer and a $PO_3$-compensated phenothiazine-thiophene cross-linked copolymer, represented by respective chemical formulas:

-continued

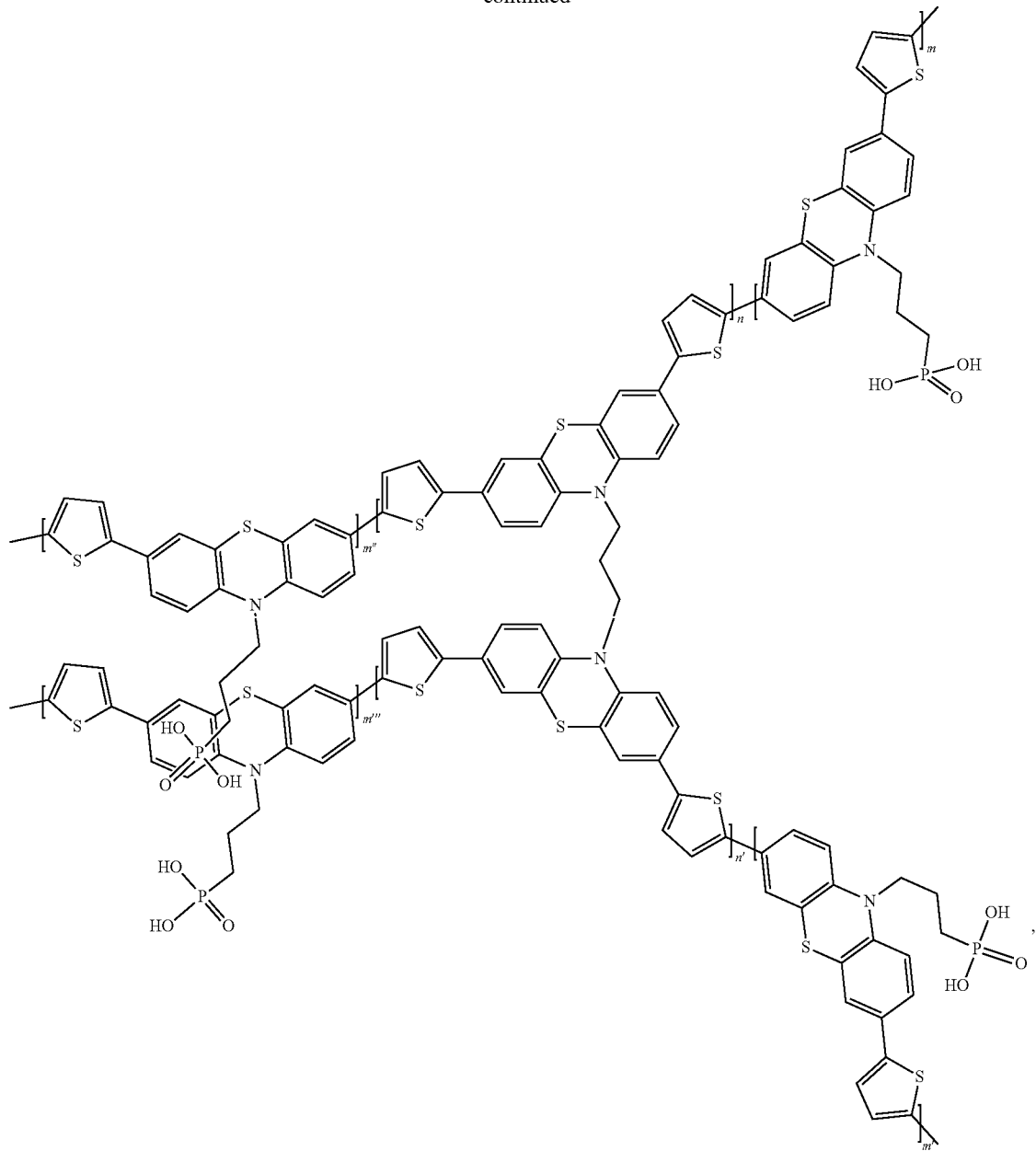

wherein each of m and n is an integer representing repetition of respective subunits of the structural group (between 1 and about 100,000, between about 10 and about 50,000, or between about 25 and about 10,000), wherein a ratio of m:n can be between about 0.5 and about 2.0, between 0.8 and about 1.2, or between about 0.9 and about 1.1, for instance about 1:1. It will be understood that, where a copolymer is represented as "$A_xB_y$," each of x and y independently represents a value between 1 and about 100,000, between about 10 and about 50,000, or between about 25 and about 10,000. Furthermore, the unit "$A_xB_y$" itself can repeat such that the polymer is represented as "$[A_xB_y]_z$," where z has a value between about 1 to about 100,000, between about 10 and about 50,000, or between about 25 and about 10,000.

Figure 9:
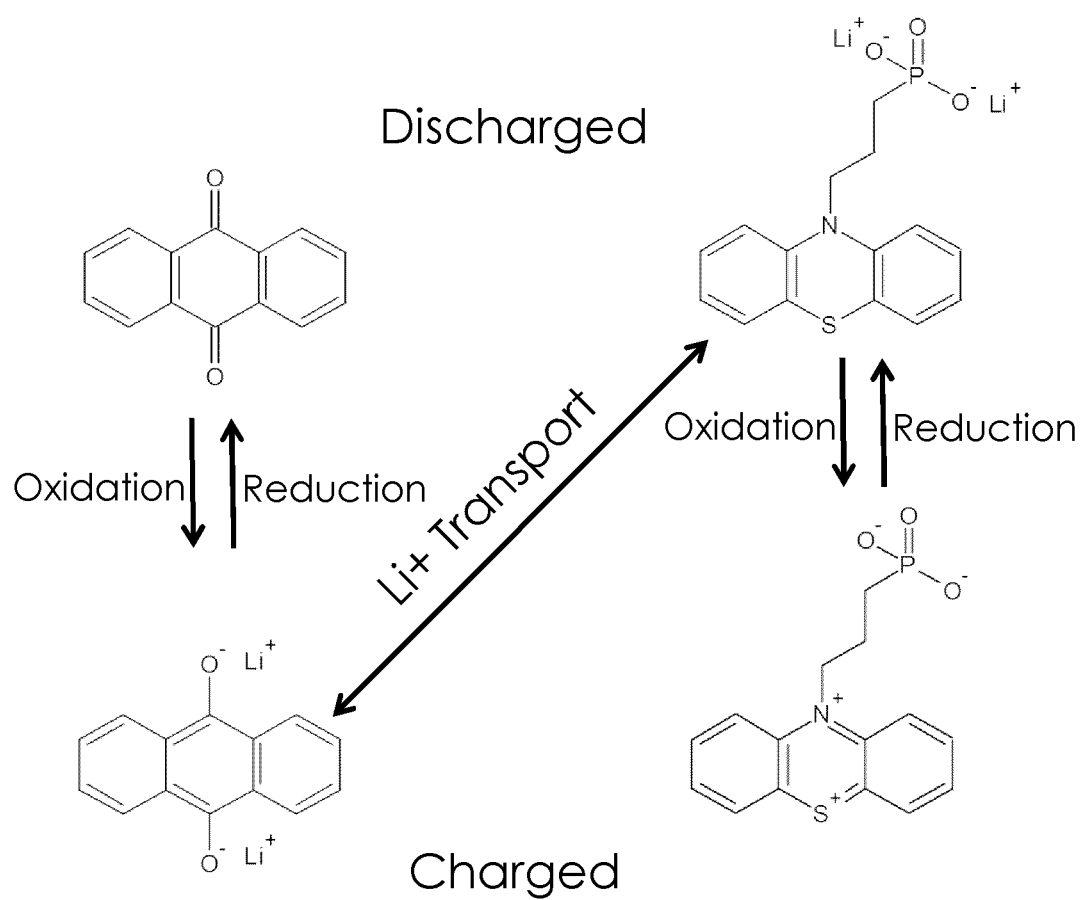
FIG. 9 depicts an electrochemical cell comprising a negative electrode comprising an n-type polymer and a positive electrode comprising a self-compensated p-type polymer which includes a zwitterionic polymer unit, undergoing electrochemical redox processes during a discharge operation and a charge operation, according to some embodiments.

FIG. 9 depicts an electrochemical cell in a configuration analogous to that of FIGS. 6(a) and 6(b). In FIG. 9, the left side corresponds to a negative electrode comprising an n-type polymer unit and the right side corresponds to a positive electrode comprising a self-compensated p-type polymer unit which includes a self-compensating zwitterionic polymer unit. In the illustrated embodiment of FIG. 9, the self-compensating zwitterionic polymer unit includes one of $PO_3$-compensated phenothiazine-based polymer molecules disclosed above. Similar to the electrochemical cell described above with respect to FIGS. 6(a) and 6(b), FIG. 9 illustrates the $PO_3$-compensated phenothiazine-based polymer molecule undergoing electrochemical redox processes between a discharged state (upper) and a charged state (lower), respectively, according to some embodiments.

Similar FIGS. 6(a) and 6(b), in FIG. 9, during a discharge/charge process, the n-type polymer (left) comprising a negative electrode redox active polymer and is configured to be oxidized/reduced from/to an anionic state (lower left) to/from a neutral state (upper left). As electrons flow between the negative electrode (left) and the positive electrode (right), mobile cations (e.g., Li$^+$) migrate through an electrolyte material (not shown). During the discharge/charge process, the positive electrode (right) comprising the p-type polymer unit including the PO$_3$-compensated phenothiazine-based polymer molecule is reduced/oxidized from/to a zwitterionic state (lower right) to/from an anionic state (upper right). In the zwitterionic state, the charge of the PO$_3$-compensated phenothiazine-based polymer molecule is compensated internally within the polymer unit itself via "self-compensation," while in the non-zwitterionic (anionic) state the charge is compensated by the mobile Li$^+$.

In some embodiments, the zwitterionic species may be stabilized by a suitable method. For example, charge screening may be accomplished by the addition of an additive like a small polar molecule, a low dielectric additive, a different charge compensating polymer, a derivative or combination thereof. A suitable salt may be mixed in the polymeric matrix to stabilize and/or screen the charge. As another example, the polymer may be crystallized or otherwise oriented such that opposite charges of the polymer system is oriented in such a way as to facilitate charge relaxation.

In some embodiments, the at least one of the negative electrode active material and the positive electrode active material further comprises a low dielectric additive configured to screen a zwitterionic charge. Examples of the low dielectric additive include plasticizers, ionic liquids, organic solvents. The low dielectric additive can advantageously selected to have a dielectric constant less than about 10, or less than about 8.

For example, any organic solvent known in the art may be used including but not limited to: acetonitrile, n-methyl-pyrrolidine, dimethylformamide, dimethylsulfoxide, tetrahydrofuran, and so on.

For example, any ionic liquid known in the art may be used including but not limited to: tetramethylammonium salts, or more generally tetraalkylammonium salts, or tetraorganoammonium salts, organoamines, imidazolium salts, pyridinium salts, and so on.

For example, any suitable plasticizer known to those skilled in the art may be used including but not limited to: Phthalates: Bis(2-ethylhexyl) phthalate (DEHP), Diisononyl phthalate (DINP), Di-n-butyl phthalate (DnBP, DBP), Butyl benzyl phthalate (BBzP), Diisodecyl phthalate (DIDP), Dioctyl phthalate (DOP or DnOP), Diisooctyl phthalate (DIOP), Diethyl phthalate (DEP), Diisobutyl phthalate (DIBP), Di-n-hexyl phthalate, Dioctyl terephthalate (DEHT); Trimellitates: Trimethyl trimellitate (TMTM), Tri-(2-ethylhexyl) trimellitate (TEHTM-MG), Tri-(n-octyl,n-decyl) trimellitate (ATM), Tri-(heptyl,nonyl) trimellitate (LTM), n-octyl trimellitate (OTM); Adipates: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM); Sulfonamides: N-ethyl toluene sulfonamide (ortho and para isomers ETSA), N-(2-hydroxypropyl) benzene sulfonamide (HP BSA), N-(n-butyl) benzene sulfonamide (BBSA-NBBS); Phosphates: Tricresyl phosphate (TCP), Tributyl phosphate (TBP); Citrates: Triethyl citrate (TEC), Acetyl triethyl citrate (ATEC), Tributyl citrate (TBC), Acetyl tributyl citrate (ATBC), Trioctyl citrate (TOC), Acetyl trioctyl citrate (ATOC), Trihexyl citrate (THC), Acetyl trihexyl citrate (ATHC), Butyryl trihexyl citrate (BTHC, trihexyl o-butyryl citrate), Trimethyl citrate (TMC); Other plasticizers: Benzoates, 1,2-Cyclohexane dicarboxylic acid diisononyl ester, Epoxidized vegetable oils, alkyl sulphonic acid phenyl ester (ASE), Triethylene glycol dihexanoate (3G6, 3GH), Tetraethylene glycol diheptanoate (4G7).

In some embodiments, the at least one of the negative electrode active material and the positive electrode active material further comprises a charge compensating polymer configured to screen a zwitterionic charge. Examples of the charge compensating additives or polymers include ionic liquids, organic solvents (e.g. NMP, acetonitrile), polymer derivative of small molecule organic solvents, derivatives or combinations thereof. For example, charge compensating polymers may be non-conductive polyvinylstyrene, polyacrylic acid, polystyrene, poly styrenesulfonate, polyvinylbenzoate, polyvinylbenzohydroxamate, poly s tenetrifluoroborate, polyanilinesulfone, polyphenylsulfonate, ammonium polystyrene, ammonium polyvinylstyrene, derivatives and combinations thereof.

Figure 10:
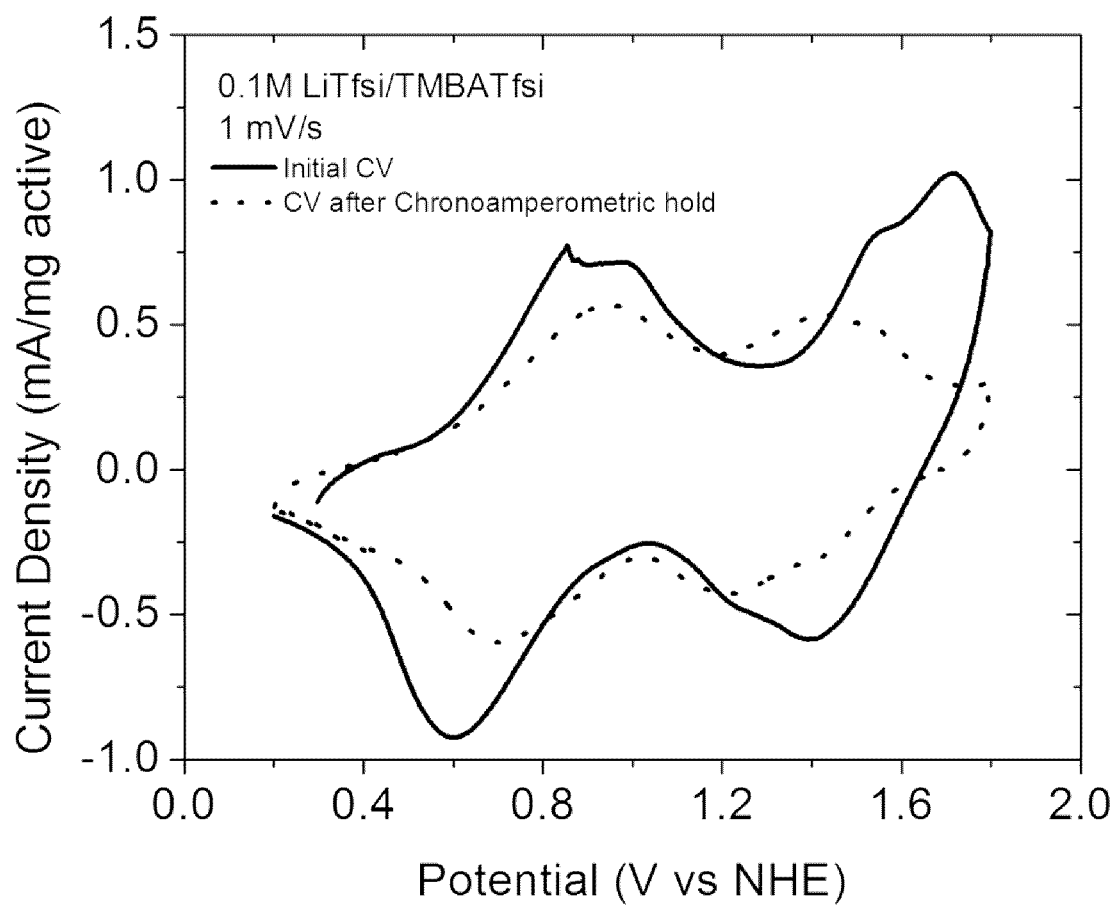
FIG. 10 illustrates cyclic voltammograms showing current-voltage characteristics of an electrochemical cell comprising a self-compensated polymer which includes a zwitterionic polymer unit, according to embodiments.

FIG. 10 illustrates cyclic voltammograms showing current-voltage characteristics of an electrochemical cell comprising a self-compensated polymer which includes a zwitterionic polymer unit, according to embodiments. The illustrated voltammograms were obtained from an electrochemical cell in a three electrode cell configuration having a PO$_3$-compensated phenothiazine-aniline copolymer as an active electrode material for the working electrode. The solid curve represents an initial sweep and the dotted curve represents a subsequent sweep after a chronoamperometric hold under at 1.7V vs. NHE for one hour to oxidize the active electrode material, similar to the hold conditions described with respect to FIG. 11 below. The electrolyte used was 0.1M lithium bis(trifluoromethanesulfonyl)imide (LiTFSI) in trimethyl butyl ammonium TFSI. As illustrated, the redox wave near about 0.7 V (between about 0.6 V and 0.8 V) corresponds to the aniline subunit of the copolymer and the redox waves near about 1.4 V (between about 1.3 V and 1.5V) and about 1.6 V (between about 1.5 V and about 1.7 V) correspond to the two-electron redox process for the compensated phenothiazine subunit of the polymer (two peaks visible).

Figure 11:
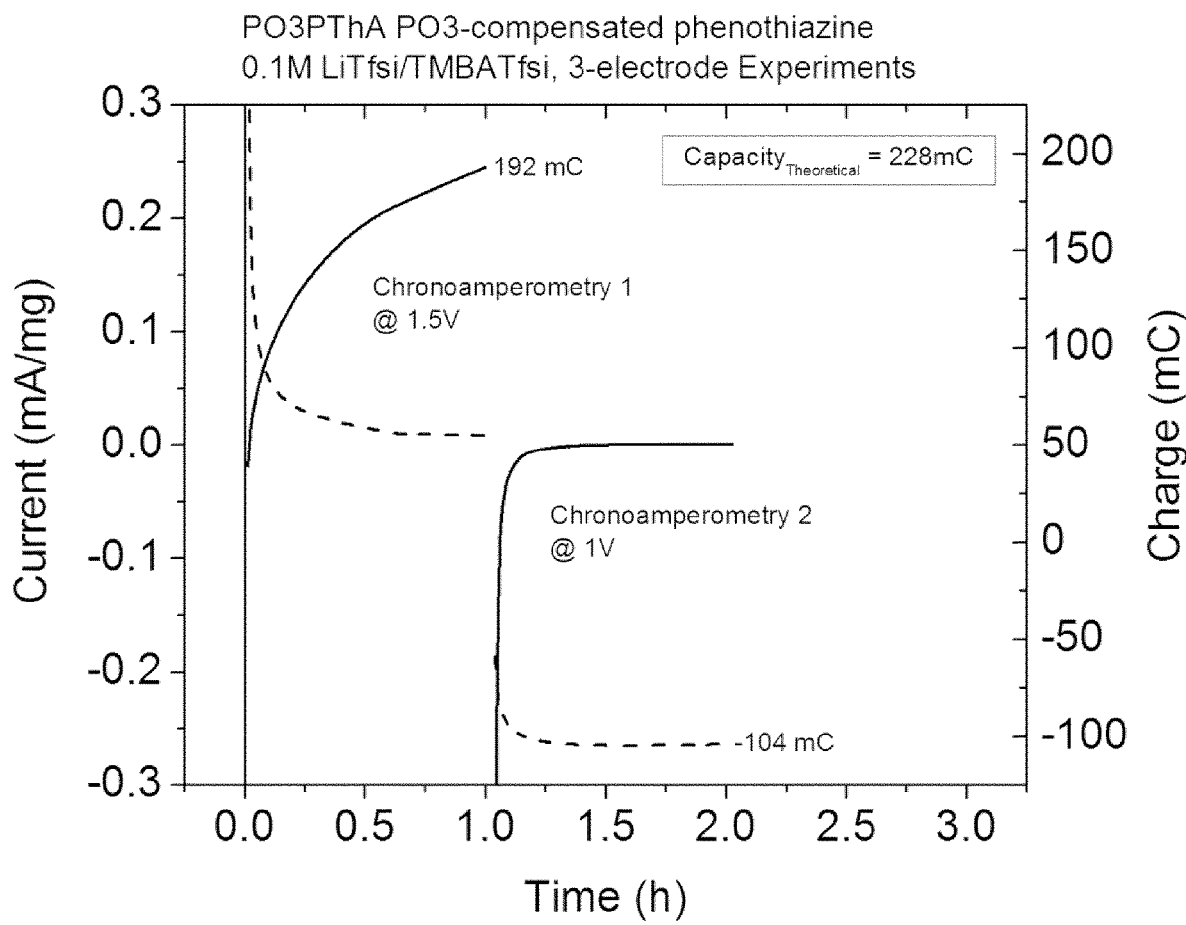
FIG. 11 illustrates chronoamperiometric curves showing current-time and charge-time characteristics of an electrochemical cell comprising a self-compensated polymer which includes a zwitterionic polymer unit, according to embodiments.

FIG. 11 illustrates chronoamperiometric curves showing current-time (left y-axis) and charge-time (right y-axis) characteristics of an electrochemical cell comprising a self-compensated polymer which includes a zwitterionic polymer unit, according to embodiments. The illustrated chronoamperiometric curves were obtained from an electrochemical cell in a three electrode cell configuration having a PO$_3$-compensated phenothiazine-aniline copolymer as an active electrode material for the working electrode.. A curve whose value increases with time represents a current-time curve, while an adjacent curve whose value decreases with time represents a corresponding charge-time curve. The current-time/charge-time curve pair on the left represent a chronoamperometric hold to oxidize at 1.7V, which was followed by a chronoamperomentric hold at 1 volt to reduce, represented by the current-time/charge-time curve pair on the right. In the illustrated embodiment, the resulting charge retention is 54%, which may be lower than typical characteristic charge retention for similar systems, given the solubility of the active material in the flooded three electrode cell (however in a solid-state battery system, solubility may be avoided) as also evidenced by the smaller peaks in the CV after the chronoamperometirec holds as illustrated in FIG. 10.

Figure 12A:
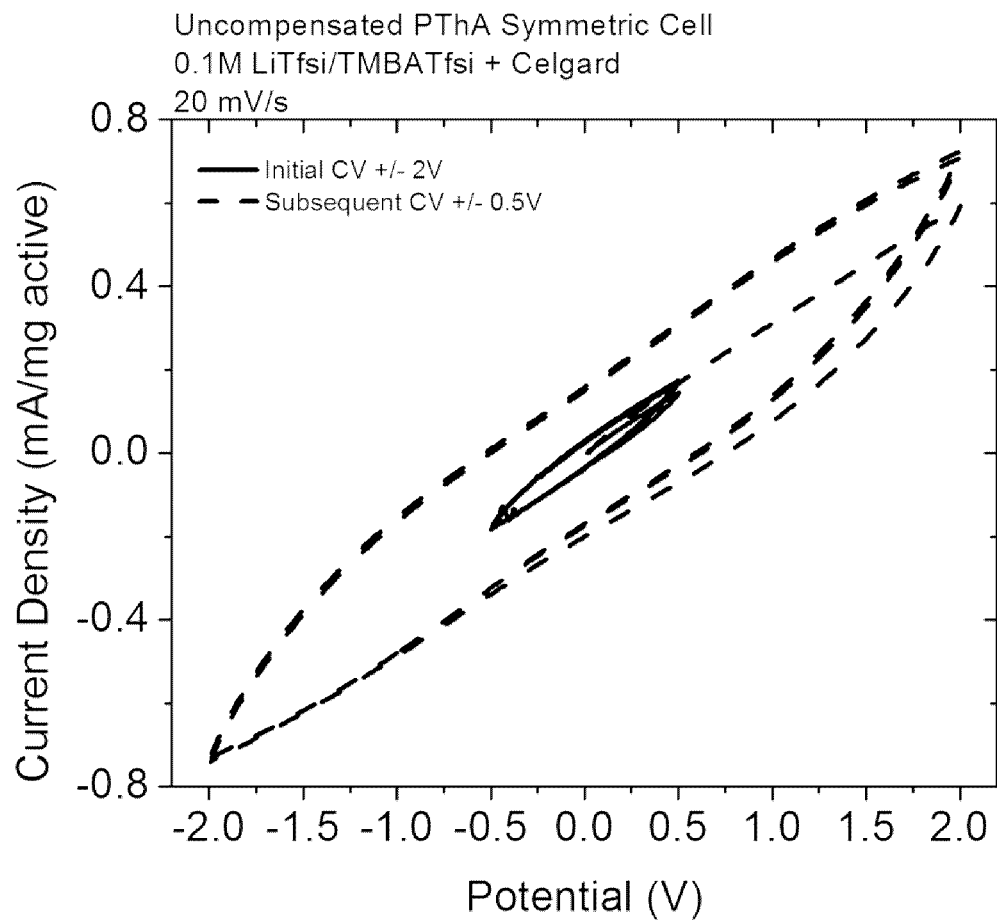
FIG. 12A illustrates cyclic voltammograms showing current-voltage characteristics of an electrochemical cell comprising an uncompensated polymer.
Figure 12B:
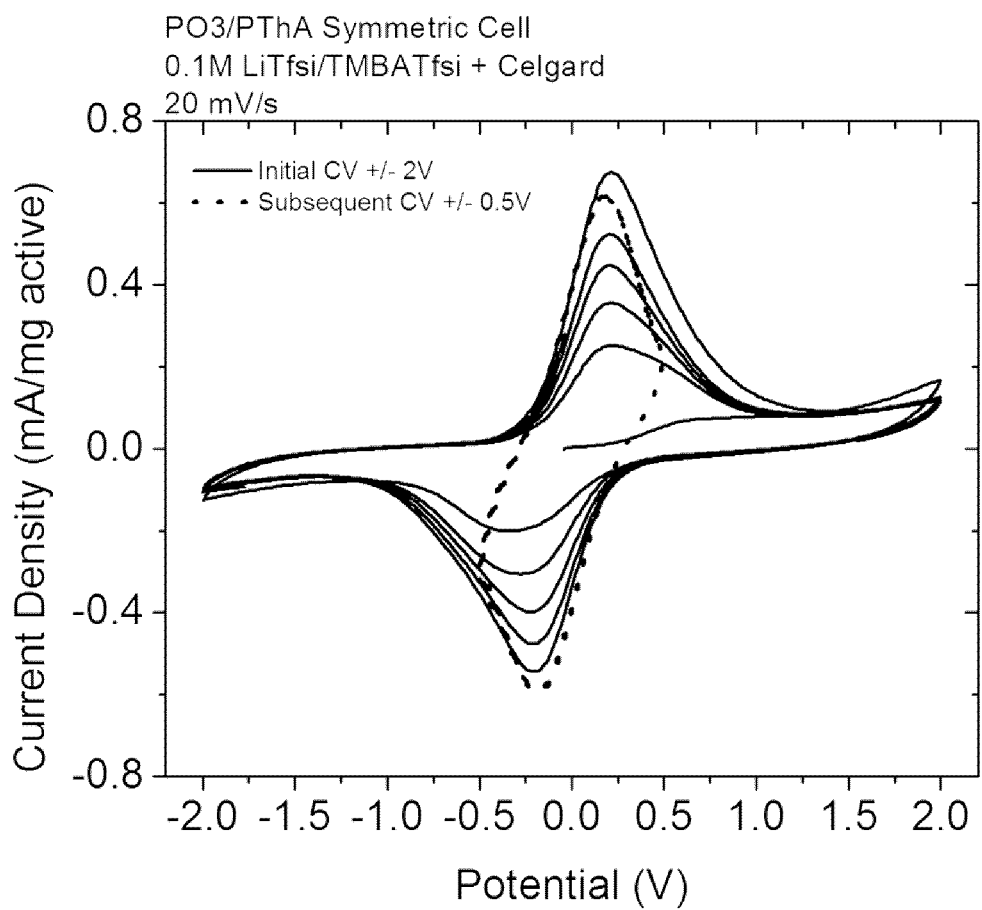
FIG. 12B illustrates cyclic voltammograms showing current-voltage characteristics of an electrochemical cell comprising a self-compensated polymer which includes a zwitterionic polymer unit, according to embodiments.

FIG. 12A illustrates cyclic voltammograms showing current-voltage characteristics of an electrochemical cell comprising an uncompensated polymer. By comparison, FIG.

12B illustrates cyclic voltammograms showing current-voltage characteristics of an electrochemical cell comprising a self-compensated polymer which includes a zwitterionic polymer unit, according to embodiments. The illustrated voltammograms were obtained from an electrochemical cell in a symmetric cell configuration having a $PO_3$-compensated phenothiazine-aniline copolymer as an active electrode material for the positive electrode. It will be appreciated that the technique employed to obtain the cyclic voltammograms of FIGS. 12A and 12B allows for an evaluation of the behavior of each particular electrode in the electrochemical cell by eliminating the effect of the other electrode to which it would be conventionally coupled in a battery. Comparing FIGS. 12A and 7B, the symmetric cell with an electrode having $PO_3$-compensated phenothiazine-aniline copolymer as an active electrode material (FIG. 12B) exhibits a relatively fast kinetics with minimal IR drop i.e. sharp onset current with onset potential close to zero volts. In contrast, the symmetric cell with an electrode having an uncompensated phenothiazine-aniline copolymer as an active electrode material (FIG. 12A) exhibits a significant resistance in the cyclic voltammogram. The cells were assembled in the discharged state. As the potential is swept away from zero, charge is added into the cell in an increasing manner. If the potential is kept +/−0.5V subsequent to addition of charge into the cell, charge transfer between the two identical electrodes in the absence of side reactions can be observed.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An electrochemical energy storage device comprising:
    a first electrode layer comprising a first redox-active polymer having mobile ions and mobile electrons, the first electrode layer having a first redox potential;
    a second electrode layer comprising a second redox-active polymer having mobile ions and mobile electrons, the second electrode layer having a second redox potential that is higher than the first redox potential, and wherein at least one of the first electrode layer and the second electrode layer comprises a plasticizer; and
    an electrolyte layer interposed between the first electrode layer and the second electrode layer.

2. The electrochemical energy storage device of claim 1, wherein the plasticizer is a dielectric additive.

3. The electrochemical energy storage device of claim 2, wherein the dielectric additive is a low dielectric additive having a dielectric constant of less than 10.

4. The electrochemical energy storage device of claim 2, wherein the dielectric additive is a low dielectric additive having a dielectric constant of less than 8.

5. The electrochemical energy storage device of claim 1, wherein the plasticizer comprises an ester of a polycarboxylic acid, an ester, or a phthalate ester.

6. The electrochemical energy storage device of claim 1, wherein the plasticizer comprises a phthalate, a trimellitate, an adipate, a sulfonamide, a phosphate, a citrate, or a benzoate.

7. The electrochemical energy storage device of claim 1, wherein at least one of the first electrode layer and the second electrode layer comprises a protective compound configured to protect at least one of the first redox-active polymer and the second redox-active polymer from over-charging or over-discharging.

8. The electrochemical energy storage device of claim 7, wherein both of the first electrode layer and the second electrode layer comprise the protective compound.

9. The electrochemical energy storage device of claim 7, wherein the protective compound comprises a phenothiazine, an iodine, a tri-iodine, a benzoquinone, a naphthoquinone, or an anthraquinone.

10. The electrochemical energy storage device of claim 1, wherein at least one of the first electrode layer and the second electrode layer comprises dopants.

11. The electrochemical energy storage device of claim 10, wherein the dopants comprise charged species that are incorporated during at least one of electrochemical oxidation and a reduction process.

12. The electrochemical energy storage device of claim 1, wherein the first redox-active polymer comprises an n-type polymer including a quinoid structure.

13. The electrochemical energy storage device of claim 12, wherein the quinoid structure comprises at least one of a benzoquinone, a naphthoquinone, an anthraquinone, a hydroquinone, an aminoquinone, a polyvinylquinone, and a polycyclic quinone.

14. The electrochemical energy storage device of claim 1, wherein the second redox-active polymer comprises a p-type polymer that comprises at least one of a phenothiazine, a thiophene, a thianthrene, a phenazine, and a polyphenylenesulfide.

15. An electrochemical energy storage device comprising:
    a first electrode layer comprising a first redox-active polymer having mobile ions and mobile electrons, the first electrode layer having a first redox potential;
    a second electrode layer comprising a second redox-active polymer having mobile ions and mobile electrons, the second electrode layer having a second redox potential that is higher than the first redox potential; and
    an electrolyte layer interposed between the first electrode layer and the second electrode layer;
    wherein at least one of the first electrode layer and the second electrode layer comprises a third polymer having a higher conductivity than at least one of the first redox-active polymer and the second redox-active polymer.

16. The electrochemical energy storage device of claim 15, wherein the third polymer comprises at least one of polyacetylenes, polypyrroles, polyanilines, polyfluorenes, polyphenylenes, polypyrenes, polyazulenes, polynaphthalenes, polyphenylenevinylenes, polycarbazoles, polyindoles, polyazepines, polythiophenes, polyphenylenesulfides, and derivatives thereof.

17. An electrochemical energy storage device comprising:
    a first electrode layer comprising a first redox-active polymer having mobile ions and mobile electrons, the first electrode layer having a first redox potential;
    a second electrode layer comprising a second redox-active polymer having mobile ions and mobile electrons, the second electrode layer having a second redox potential that is higher than the first redox potential; and
    an electrolyte layer interposed between the first electrode layer and the second electrode layer;
    wherein at least one of the first electrode layer and the second electrode layer comprises an additive configured to increase a porosity of at least one of the first electrode layer and the second electrode layer.

18. The electrochemical energy storage device of claim 17, wherein the additive comprises a tetrahedral monomer, a third polymer having greater solubility in a solvent than at least one of the first redox-active polymer and the second redox-active polymer, a gas phase foaming agent, or a chemically decomposing foaming agent.

* * * * *